(12) United States Patent
Kenzler et al.

(10) Patent No.: US 12,115,034 B2
(45) Date of Patent: Oct. 15, 2024

(54) TOOTHBRUSH WITH DISPOSABLE IRRIGATOR

(71) Applicant: OralKleen, LLC, Phoenix, AZ (US)

(72) Inventors: Kurt Kenzler, Phoenix, AZ (US); Virginia Prendergast, Phoenix, AZ (US); Mike Winterhalter, Sarasota, FL (US); Barry Jennings, Largo, FL (US); Matthew Vergin, North St. Petersburg, FL (US)

(73) Assignee: OralKleen, LLC, Phoenix, AZ (US)

( * ) Notice: Subject to any disclaimer, the term of this patent is extended or adjusted under 35 U.S.C. 154(b) by 0 days.

(21) Appl. No.: 18/516,807

(22) Filed: Nov. 21, 2023

(65) Prior Publication Data

US 2024/0081964 A1 Mar. 14, 2024

Related U.S. Application Data

(63) Continuation of application No. 17/860,045, filed on Jul. 7, 2022, now Pat. No. 11,819,372.

(60) Provisional application No. 63/219,071, filed on Jul. 7, 2021.

(51) Int. Cl.
*A61C 17/22* (2006.01)

(52) U.S. Cl.
CPC .......... *A61C 17/227* (2013.01); *A61C 17/222* (2013.01); *A61C 2204/002* (2013.01)

(58) Field of Classification Search
CPC ..... A61C 17/227; A61C 17/222; A61C 17/12; A61C 17/13; A61C 17/08; A61C 17/0208; A61C 17/0211
See application file for complete search history.

(56) References Cited

FOREIGN PATENT DOCUMENTS

WO WO-2020243721 A1 * 12/2020 ......... A61C 17/0208

* cited by examiner

*Primary Examiner* — Shay Karls
(74) *Attorney, Agent, or Firm* — KOLITCH ROMANO DASCENZO GATES LLC

(57) ABSTRACT

An electric toothbrush is disclosed, having a handle including a drive motor and a head portion removably coupled to the handle. The head portion includes a brush, an exit port fed by an internal irrigation lumen, and a drive shaft operatively connecting the drive motor to the brush. A disposable irrigant reservoir is removably coupled directly to the head portion. The irrigant reservoir is in fluid communication with the internal irrigation lumen of the head portion. The head portion is configured to be replaceable with respect to the handle, and the irrigant reservoir is configured to be replaceable independent of the head portion. In some examples, the irrigant reservoir is a disposable bulb (e.g., a capsule), and is positioned such that the user can hold the handle while also squeezing the reservoir with the same hand. In some examples, the toothbrush head includes a suction mechanism.

1 Claim, 20 Drawing Sheets

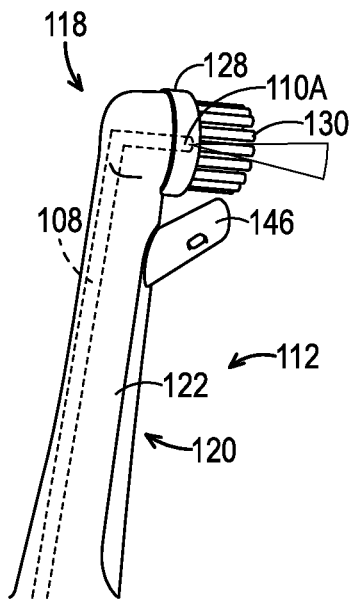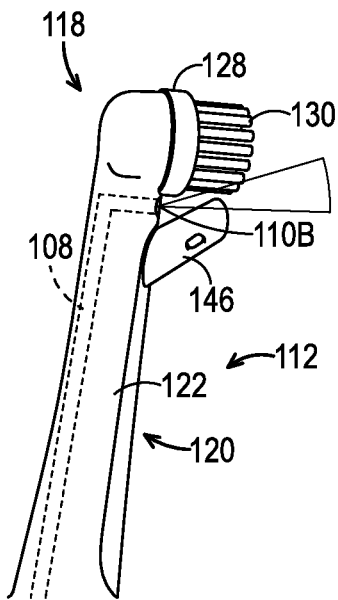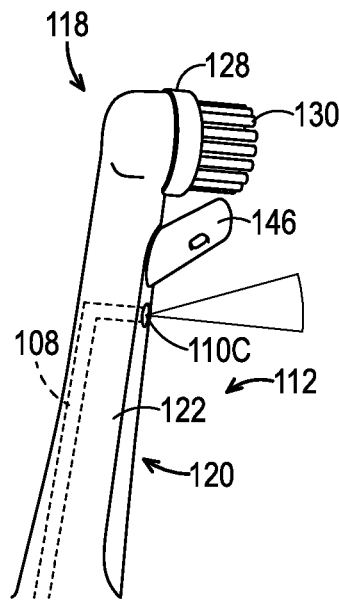
FIG. 32      FIG. 33      FIG. 34
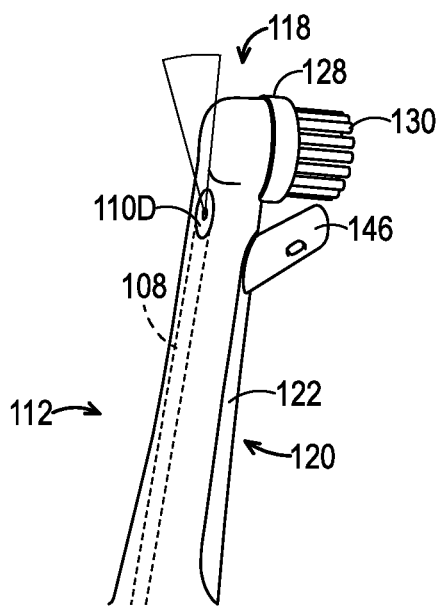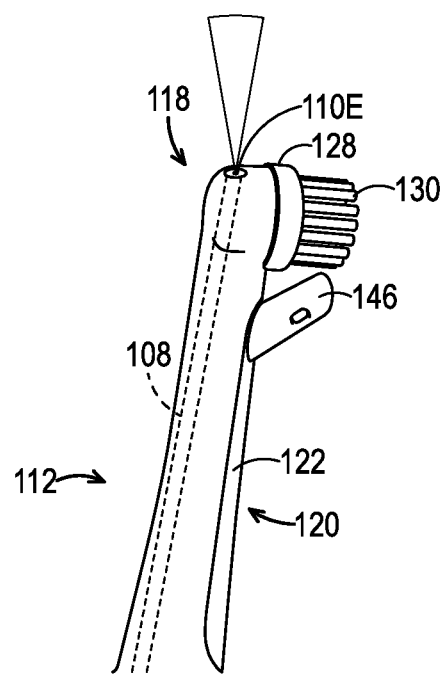
FIG. 35      FIG. 36

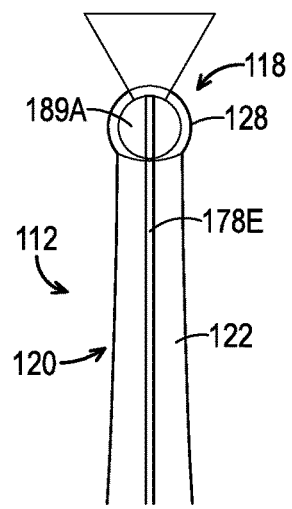 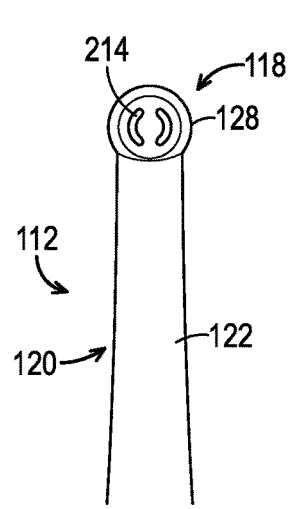 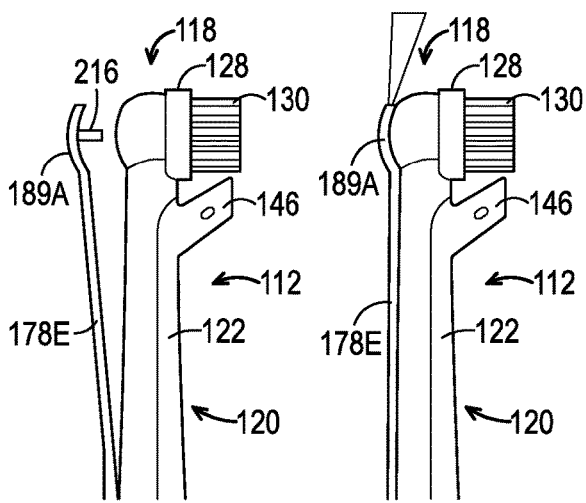
FIG. 46    FIG. 47    FIG. 48    FIG. 49
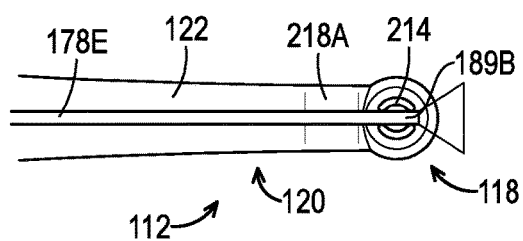 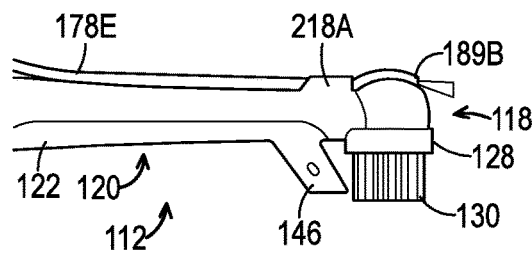
FIG. 50    FIG. 51
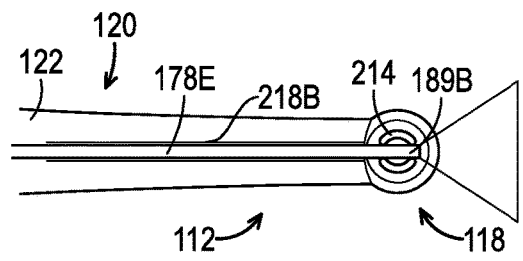 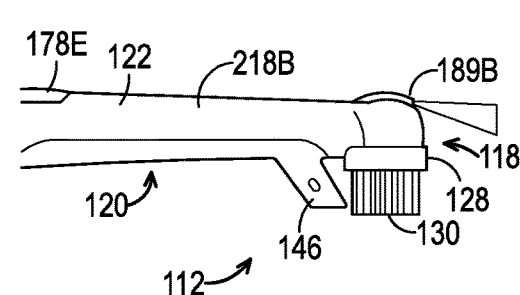
FIG. 52    FIG. 53

TOOTHBRUSH WITH DISPOSABLE IRRIGATOR

CROSS-REFERENCES

The following applications and materials are incorporated herein, in their entireties, for all purposes: U.S. Provisional Patent Application Ser. No. 63/219,071, filed Jul. 7, 2021.

FIELD

This disclosure relates to systems and methods for dental hygiene. More specifically, the disclosed embodiments relate to powered toothbrush systems used by dental hygienists, ICU nurses, and other caregivers.

INTRODUCTION

Individuals who classify as dependent patients often suffer from a variety of conditions pertaining to physical and/or cognitive disorders or injuries, and require assistance from caregivers to perform activities of daily living (i.e., basic physical needs), and in specific, hygiene activities. This classification also pertains to those being cared for in an Intensive Care Unit (ICU) that may be unconscious, sedated, or incapacitated and unable to care for themselves. Dependent patients often struggle to preform hygienic activities due to the necessary involvement of fine motor skills and cognitive awareness. Due to the necessity of these tasks many such individuals either live in long-term care facilities, with a plethora of staff to aid them, or require a designated caretaker at home. In some examples, hygiene activities such as tooth brushing must be performed by attendants, nursing aides, or ICU staff as an individual may lack the physical or cognitive ability to perform the required tasks. In extreme cases, such as those where a dependent patient is ventilated in an ICU, nurses often must use at least one hand to gain access to an unresponsive patient's teeth or tongue and thus struggle to operate oral hygiene tools that require the use of both hands. Due to the vulnerable nature of the patients, all equipment that is to be used in an ICU must adhere to strict Infection Control (IC) standards.

SUMMARY

The present disclosure provides systems, apparatuses, and methods relating to improved electric toothbrushes, for example those suitable for use in caregiving environments where infection controls are in effect.

In some examples, a method of operation for an electric toothbrush includes: coupling a first head portion to a handle portion of the electric toothbrush, such that a drive shaft of the first head portion is operatively connected to a drive motor of the handle portion; removably coupling an irrigant reservoir directly to the first head portion using a mounting connector of the irrigant reservoir; placing a fluid connector of the irrigant reservoir into fluid communication with an internal irrigation conduit of the first head portion, wherein the mounting connector and the fluid connector extend from a body of the reservoir; compressing an externally accessible wall of the body of the irrigant reservoir; and detaching the first head portion from the handle portion of the electric toothbrush while the reservoir remains with the first head portion.

In some examples, an electric toothbrush of the present disclosure includes a handle including a drive motor; a head portion removably coupled to the handle, the head portion including a brush, an exit port fed by an internal irrigation lumen, and a drive shaft operatively connecting the drive motor to the brush; a disposable irrigant reservoir removably coupled directly to the head portion, wherein the irrigant reservoir is in fluid communication with the internal irrigation lumen of the head portion; wherein the head portion is configured to be replaceable with respect to the handle, and the irrigant reservoir is configured to be replaceable independent of the head portion.

In some examples, a method of using an electric toothbrush of the present disclosure includes coupling a first irrigant cartridge to a first head of a motorized toothbrush, such that contents of the cartridge are in fluid communication with an irrigation lumen of the head of the toothbrush, wherein the irrigation lumen is coupled to an exit port of the head; holding a handle of the toothbrush while squeezing an irrigant reservoir of the first cartridge to expel an irrigant from the exit port using a same hand; replacing the first cartridge with a second irrigant cartridge; removing the first head from the handle, such that the second irrigant cartridge remains with the head; and replacing the first head with a second head.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 32 is an isometric view of an illustrative first irrigation exit port of a toothbrush irrigation system having an at least partially internal irrigation lumen, in accordance with aspects of the present disclosure.

FIG. 33 is an isometric view of an illustrative second irrigation exit port of a toothbrush irrigation system having an at least partially internal irrigation lumen, in accordance with aspects of the present disclosure.

FIG. 34 is an isometric view of an illustrative third irrigation exit port of a toothbrush irrigation system having an at least partially internal irrigation lumen, in accordance with aspects of the present disclosure.

FIG. 35 is an isometric view of an illustrative fourth irrigation exit port of a toothbrush irrigation system having an at least partially internal irrigation lumen, in accordance with aspects of the present disclosure.

FIG. 36 is an isometric view of an illustrative fifth irrigation exit port of a toothbrush irrigation system having an at least partially internal irrigation lumen, in accordance with aspects of the present disclosure.

FIG. 46 is a rear view of a head portion of the illustrative toothbrush irrigation system with an illustrative first irrigation nozzle coupled to an external irrigation tube of an illustrative irrigation cartridge.

FIG. 47 is another rear view of a head portion of the illustrative toothbrush irrigation system without the illustrative first irrigation nozzle, in accordance with aspects of the present disclosure.

FIG. 48 is a side view of the illustrative first irrigation nozzle uncoupled from the head portion of FIG. 46, in accordance with aspects of the present disclosure.

FIG. 49 is a side view of the illustrative first irrigation nozzle coupled to the head portion of FIG. 46, in accordance with aspects of the present disclosure.

FIG. 50 is a rear view of a head portion of the illustrative toothbrush irrigation system with an illustrative second irrigation nozzle and a first external irrigation tube coupling mechanism in accordance with aspects of the present disclosure.

FIG. 51 is a side view of the head portion with first external irrigation tube coupling mechanism of FIG. 50.

FIG. 52 is a rear view of a head portion of the illustrative toothbrush irrigation system with the illustrative second irrigation nozzle and a second external irrigation tube coupling mechanism in accordance with aspects of the present disclosure.

FIG. 53 is a side view of the head portion with second external irrigation tube coupling mechanism of FIG. 52.

DETAILED DESCRIPTION

Figure 1:
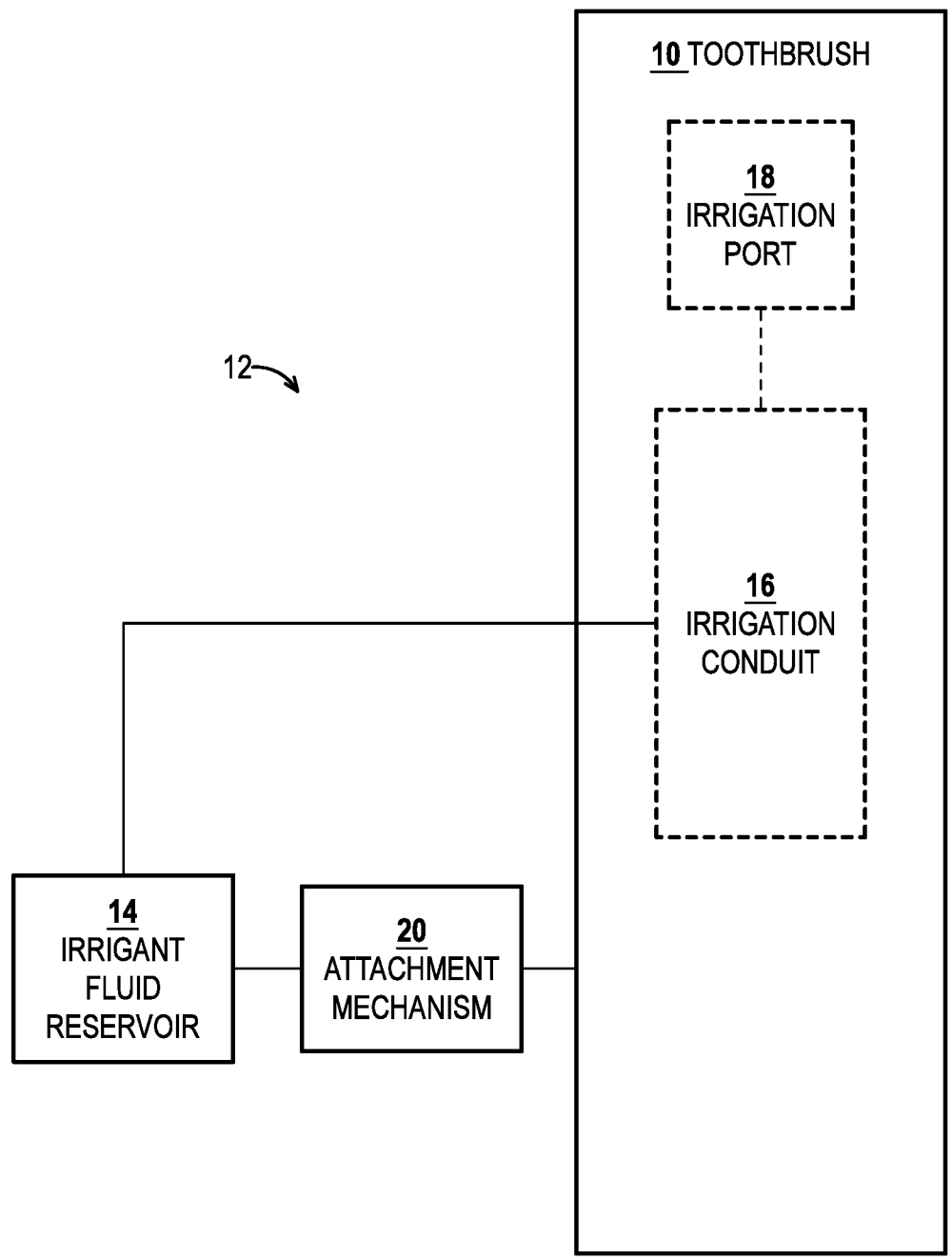
FIG. 1 is a schematic diagram of an illustrative toothbrush irrigation system in accordance with aspects of the present disclosure.

Various aspects and examples of a convenient, efficient, and sustainable tooth cleaning system with single-use onboard irrigation system configured to meet infection control standards, as well as related methods, are described below and illustrated in the associated drawings. Unless otherwise specified, a tooth cleaning system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a toothbrush with a disposable irrigation system in accordance with the present teachings includes a handheld toothbrush 10 generally having two main portions: a body or handle portion and a detachable head portion. Collectively, toothbrush 10 includes an oscillating or vibrating toothbrush head, an irrigation system 12, and a suction system. See FIG. 1. Generally, the toothbrush head and one or more components of irrigation system 12 are disposed in or on the detachable head portion. To facilitate infection control measures, the head portion is disposable independently of the handle, such that new disposable head portions may be interchangeably installed on an as-needed basis. Similarly, an irrigant reservoir and/or irrigation cartridge of the irrigation system is independently replaceable. In some examples, the irrigation system remains with the head portion in response to the head portion being detached. In some examples, the irrigant reservoir may releasably mount exclusively to the head portion.

Accordingly, irrigation system 12 includes an independently replaceable, prefilled, sterilized, disposable irrigation cartridge removably coupled to the handle and/or head portion of toothbrush 10. In some examples, the cartridge is removably coupled exclusively to the head portion. The irrigation cartridge has an irrigant fluid reservoir 14 coupled such that the reservoir is in fluid communication with an irrigation conduit 16 disposed in and/or coupled to toothbrush 10. In some examples, irrigant fluid reservoir 14 comprises a squeezable capsule. The irrigation cartridge further includes an attachment mechanism comprising a mounting connector and a fluid connector (e.g., an external irrigation tube and/or one or more types of nozzles (e.g., mating nozzle, irrigation nozzle, etc.)).

FIG. 1 is a schematic diagram of toothbrush irrigation system 12. The irrigation system includes irrigant fluid reservoir 14, irrigation conduit 16 (e.g., an external irrigation tube and/or an at least partially internal irrigation lumen), an irrigation exit port 18, and/or an attachment mechanism 20. Irrigant fluid reservoir 14 may include one or more sealed, prefilled, and disposable capsules or bulbs having a controlled volume. Specifically, the irrigant fluid reservoir may be prefilled with a sterile irrigating solution and sealed (e.g., to meet infection control standards and increase shelf life of the cartridge). Irrigant fluid reservoir 14 may be removably coupled to toothbrush 10 by way of attachment mechanism 20. Attachment mechanism 20 may include any structure and/or device configured to secure irrigant fluid reservoir 14 to toothbrush 10 and/or to fluidly couple irrigant fluid reservoir 14 to irrigation conduit 16. The attachment mechanism may be included in the irrigation cartridge (e.g., the mounting connector) and/or toothbrush 10 (e.g., a coupling connector). For example, attachment mechanism 20 may be incorporated into an outer surface of irrigant fluid reservoir 14, and/or integrated into a surface of toothbrush 10.

The irrigant fluid reservoir is in fluid communication with irrigation exit port 18 disposed in or on toothbrush 10 by way of irrigation conduit 16. The irrigation conduit may be an at least partially internal lumen or passageway disposed in a head portion of toothbrush 10 and/or an external passageway (e.g., an external irrigation tube) coupled to an exterior of the toothbrush. Irrigation system 12 is configured to facilitate the selective expulsion or spraying of water, saline solution, or any other suitable irrigation liquid from a distal end portion of toothbrush 10.

If the irrigant fluid reservoir of the irrigation cartridge becomes empty before the tooth cleaning process is complete, a user can dispose of the empty cartridge and attach or install a new pre-filled cartridge before continuing the cleaning process. Irrigant fluid reservoir 14 of the irrigation cartridge may contain water, a saline solution, and/or any other suitable liquid. In some examples, the irrigation cartridge is unsealed manually by the user prior to installation. For example, the user may unseal (e.g., remove, tear, cut, pop off, etc.) an end of the tube or mating nozzle and attach the cartridge to the toothbrush. In some examples, the irrigant reservoir is a closed vessel such that it may be opened at point-of-use before attaching the irrigant reservoir and/or irrigation cartridge to toothbrush 10.

To operate irrigation system 12, pressure is applied to the compressible irrigant fluid reservoir either using a suitable mechanical device or by direct manual compression (e.g., by squeezing between fingers and/or squeezing against a surface of the toothbrush). This results in the contents being urged through the irrigation conduit to irrigation exit port 18 of the head portion, where the contents are expelled.

In some cases, toothbrush 10 is further configured to be coupled to a wearable (e.g., arm-mounted) module or auxiliary suction device, e.g., using tubing. The suction system of toothbrush 10 may include a suction lumen or passageway formed by an internal cavity of the head portion (e.g., the head portion may be hollow) and configured to transport waste (e.g., water, bodily fluids, food waste, etc.) from a suction or scavenge port at a distal end of the head portion to a waste collection port, e.g., disposed on a stem protruding from a proximal end of the head portion. An external suction system may include a suction (AKA scavenge) tube configured to transport the collected waste from the waste collection port to either a scavenge reservoir in or on a wearable (e.g., arm-mounted) module, or a waste container connected to an auxiliary (e.g., wall-mounted) suction device.

In cases where toothbrush 10 is coupled to a wearable module, systems of the present disclosure are self-contained in the sense that they do not require an interface with any other auxiliary system to function fully (e.g., drainage, power, water source, etc., are included within the toothbrush, wearable module, and interconnecting structures).

Toothbrush 10 includes the detachable head portion coupled to a housing of the handle portion (AKA toothbrush body). The detachable head portion includes a neck coupled on a distal end to a brush head of the oscillating toothbrush head. The neck of the head portion is at least partially hollow and includes an exterior casing that houses components of the head portion such as, a handle coupling port, a section of the suction pathway, the at least partially internal irrigation lumen, a head drive shaft, and/or other components of the oscillating toothbrush head.

The brush head of the oscillating toothbrush head includes a plurality of (e.g., five) bristles and/or brushes coupled to a distal end of the head drive shaft which is caused to oscillate by a motor (e.g., coupled to or disposed in the toothbrush body). The plurality of bristles and/or brushes are disposed on a distal end of the detachable head portion and oriented transverse to an anterior surface of the toothbrush handle. The oscillating toothbrush head is configured to clean the teeth of a patient by providing brush agitation against surfaces of the patient's teeth. In some examples, the motor is powered by a plurality of batteries (e.g., housed within the toothbrush body). In some examples, the toothbrush body includes a charging port disposed at a proximal end of the housing, which is configured to mate with a charging stand. In some examples, the toothbrush body includes a plurality of buttons and/or switches disposed on exterior surfaces of the toothbrush body. The buttons may be configured to switch the oscillating toothbrush head between an "on" and an "off" state and may be configured to switch the oscillating toothbrush head between a variety of oscillation speeds. In some examples, the buttons and/or switches may be configured to control the irrigation and suction systems.

The disposable head portion of toothbrush 10 further includes a stem having a waste collection port configured to facilitate coupling of the external scavenge tube to the toothbrush. The waste collection port is disposed in the end of the stem. The waste collection port can include a coupling configured to detachably couple the scavenge tube to the stem. The scavenge tube, which acts as the connection between the waste collection port and the waste reservoir, may include any suitable resilient material configured to be used in medical tubing. In some examples, the scavenge tube is detachable from the toothbrush waste collection port and waste reservoir for sanitization purposes.

In examples where irrigation system 12 includes the at least partially (e.g., majority) internal irrigation lumen (AKA internal irrigation lumen) disposed in the head portion, the irrigation lumen may be disposed in or formed with the exterior casing. The internal irrigation lumen may comprise an internal channel formed in the exterior casing, a metal tube that is insert molded into the exterior casing, or an internal channel that is formed by welding (e.g., sonic welding) an independent channel to an anterior or posterior surface of the exterior casing. The internal irrigation lumen can extend partially or entirely through the length of the head portion. In some examples, the internal irrigation lumen includes an internal section that extends at least partially through the length of the head portion coupled to an external section that extends out of the proximal end of the head portion.

In some examples, the head portion includes irrigation exit port 18 disposed in the exterior casing (e.g., through the anterior or posterior surfaces), in the brush head, adjacent the brush head, or in any other suitable location. Irrigation exit port 18 may be coupled to irrigation conduit 16 or may be realized as a distal opening of the irrigation conduit that is disposed through the exterior casing of the head portion. The irrigation exit port is configured to facilitate the flow of an irrigating fluid from the irrigation cartridge into the mouth of a patient.

The head portion is detachable from the handle portion for cleaning or disposal. In some examples, irrigant fluid reservoir 14 and attachment mechanism 20 (e.g., coupling connector) are disposed on the outer surface of the exterior casing and are thus included in the detachable head portion. In some examples, irrigant fluid reservoir 14 and attachment mechanism 20 are disposed adjacent the stem of the head portion or attached to the waste collection port coupling and are thus included in the detachable head portion. In some examples, irrigant fluid reservoir 14 and attachment mechanism 20 are disposed within a proximal end of the exterior casing of the head portion and are thus included in the detachable head portion.

The handheld toothbrush may comprise any suitable rigid material(s) configured to be used in medical devices, such as plastics, metals, and/or the like. In some examples, the toothbrush body portion includes a resilient grip comprising any material which may be easily sterilized, such as rubber, resilient polymers, and/or the like.

Compliance of the toothbrush to infection control standards is advantageous due to expected usage in situations where dependent patients may be immunocompromised, and thus must adhere to specific guidelines to deter the possible transmission of diseases and prevent infections. The Intensive Care Unit (ICU) of any hospital is the location where the most vulnerable patients reside, so that they can be closely monitored and treated. Patients who reside in ICUs often have the greatest risk for contracting infections, which is why many ICUs have detailed, mandatory Infection Control standards. The principles of infection control in an ICU are based on simple concepts and are enforced as basic measures that are easy to implement at the bedside. In general, there are four distinct areas of concern: preventing contact transfer, improving surface cleaning, preventing device related infections, and boosting hand hygiene compliance. Compliance with these four areas can be, for the most part, covered by adhering to standard precautions including: hand hygiene, use of personal protective equipment (e.g., gloves, mask, eyewear), respiratory hygiene (cough etiquette), sharps safety, safe injection practices, sterile instruments and devices, and clean/disinfected environmental surfaces.

In relation to the toothbrush discussed herein, the focus is on how to prevent device-related infections. This is accomplished through the utilization of sterile, single-use (AKA non-reusable) components that can be discarded and replaced with new ones. Specifically, the non-reusable components are those that come into contact with a patient's mouth, such as the brush head, irrigation exit port, and scavenge port. These non-reusable components are all located on the disposable head portion of the toothbrush for straightforward disposal and sanitization. Other components that are exposed to waste, such as the scavenge tube and/or the toothbrush body of the handle portion, can be heat sanitized (e.g., using a high temperature dishwashing machine, autoclave, etc.). In some cases, where the toothbrush is coupled with an arm-mounted module via a scavenge hose, the connected scavenge reservoir, may be detached from the system for emptying and disinfection.

Regarding the irrigation system of the present disclosure, ICUs have strict Infection Control standards to prevent the transmission of waterborne diseases and infections. To address these standards for a single-use water supply, the toothbrush taught herein utilizes a compliant single-use, sealed, prefilled, disposable, controlled-volume irrigation cartridge that may be coupled to a disposable irrigation exit port, or may comprise an irrigation exit port configured to be coupled to the brush head and/or head portion. For simplification of the sanitization and disposal process, the irrigation cartridge may be disposed on or adjacent the exterior housing of the disposable head portion. The compact nature of all non-reusable components being included onto a removable and disposable stem makes for a quick and easy clean-up process for the user. Additionally, or alternatively, the irrigation cartridge may be disposed at the coupling of the head portion and handle portion, such that it can be easily removed when the head portion is detached from the handle portion.

A method of cleaning a patient's teeth may include the preparation and attachment of the irrigation cartridge to meet specific Infection Control standards, agitating the surface of the teeth with the brush head of the oscillating toothbrush head, irrigating the mouth with the irrigation system, and removing waste with the scavenge system. In some examples, the irrigation and scavenge systems can be activated simultaneously or independently as desired.

Examples, Components, and Alternatives

The following sections describe selected aspects of illustrative tooth cleaning systems as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Toothbrush Irrigation System

As shown in FIGS. 2-10, this section describes an illustrative toothbrush irrigation system 100, which is an example of the toothbrush irrigation system described above. Toothbrush 102 is an illustrative example of toothbrush 10, described above.

Figure 2:
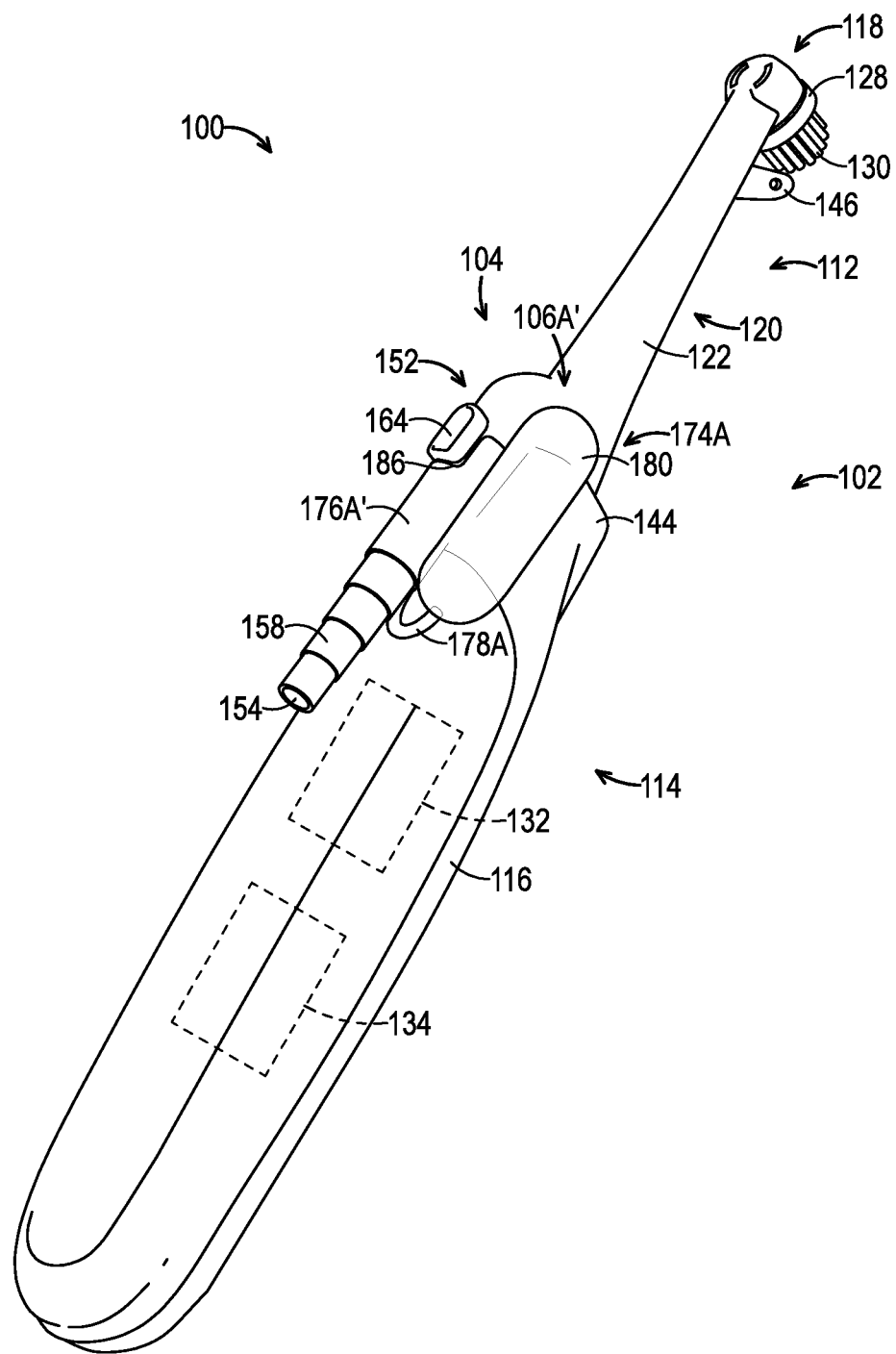
FIG. 2 an isometric view of an illustrative toothbrush irrigation system including a toothbrush and a first configuration of an irrigation cartridge in accordance with aspects of the present disclosure.
Figure 3:
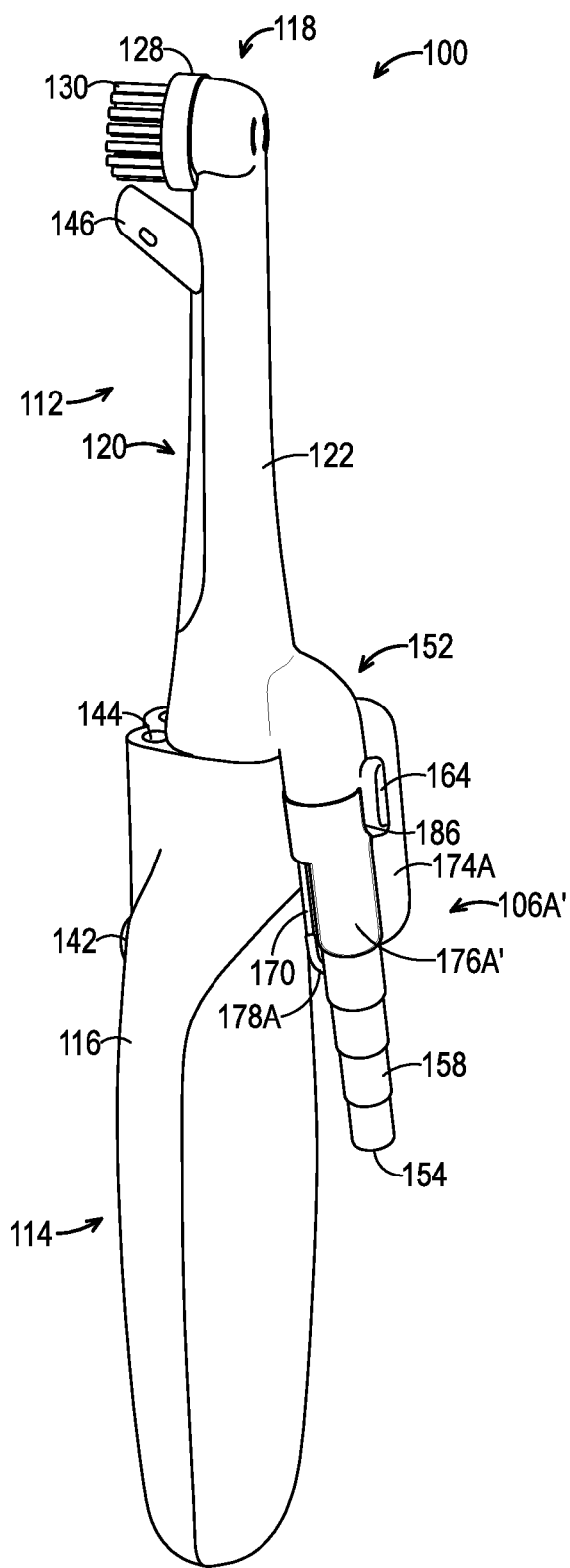
FIG. 3 is a side view of the illustrative toothbrush irrigation system of FIG. 2.
Figure 4:
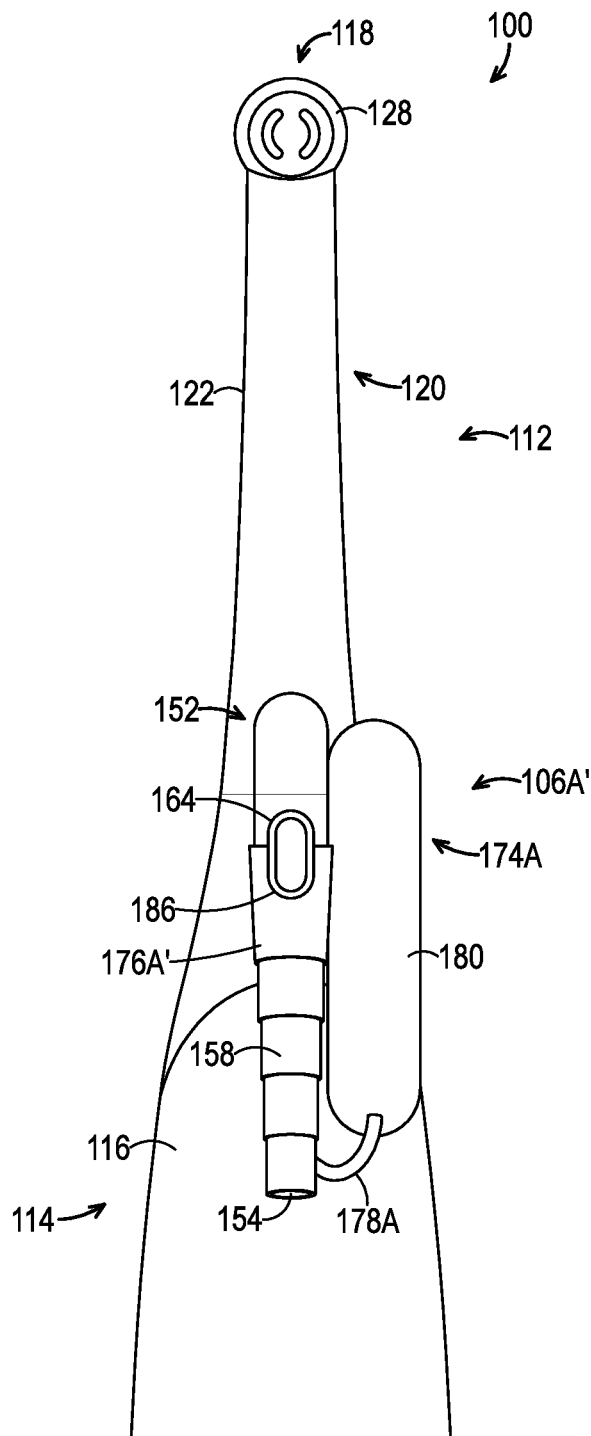
FIG. 4 is a rear view of the illustrative toothbrush irrigation system of FIG. 2.
Figure 5:
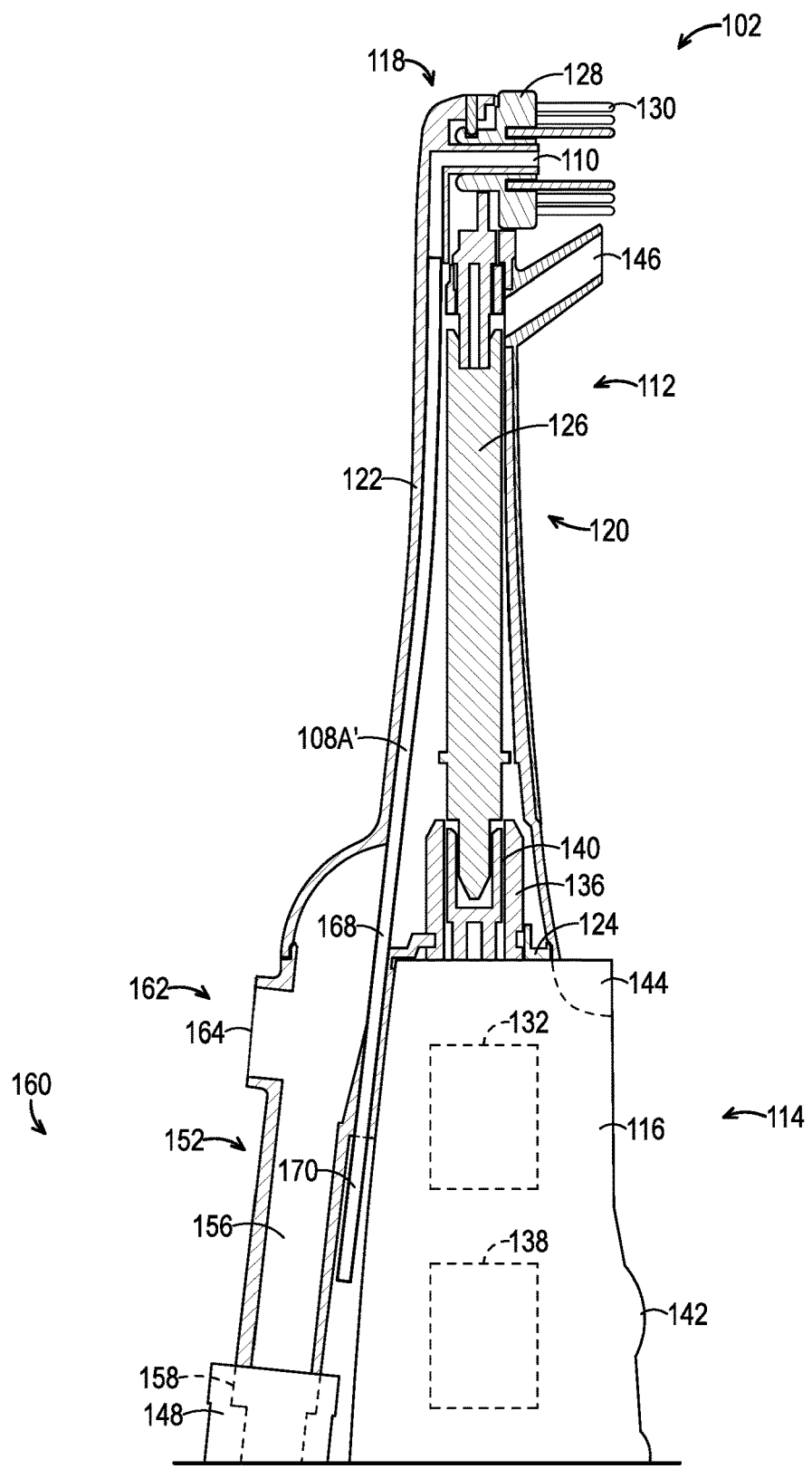
FIG. 5 is a cross-sectional view of the illustrative toothbrush of FIG. 4.
Figure 6:
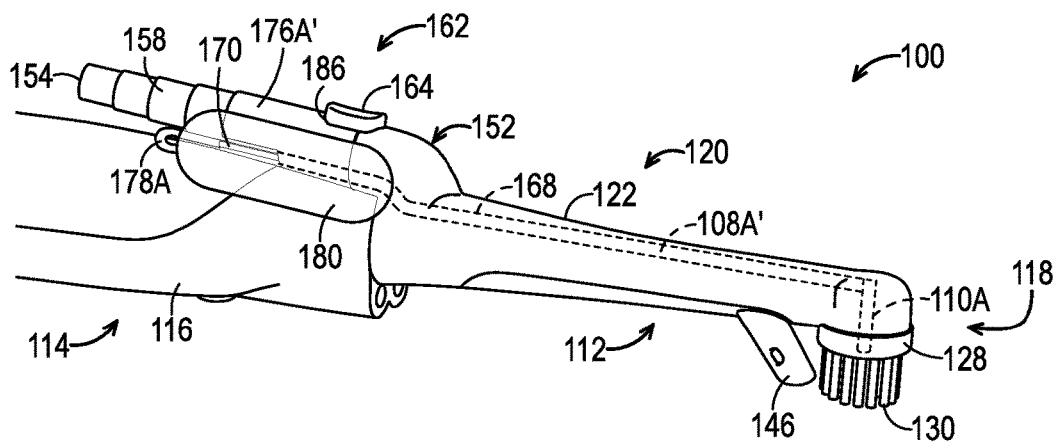
FIG. 6 is an isometric view of the illustrative toothbrush irrigation system of FIG. 2, in accordance with aspects of the present disclosure.
Figure 7:
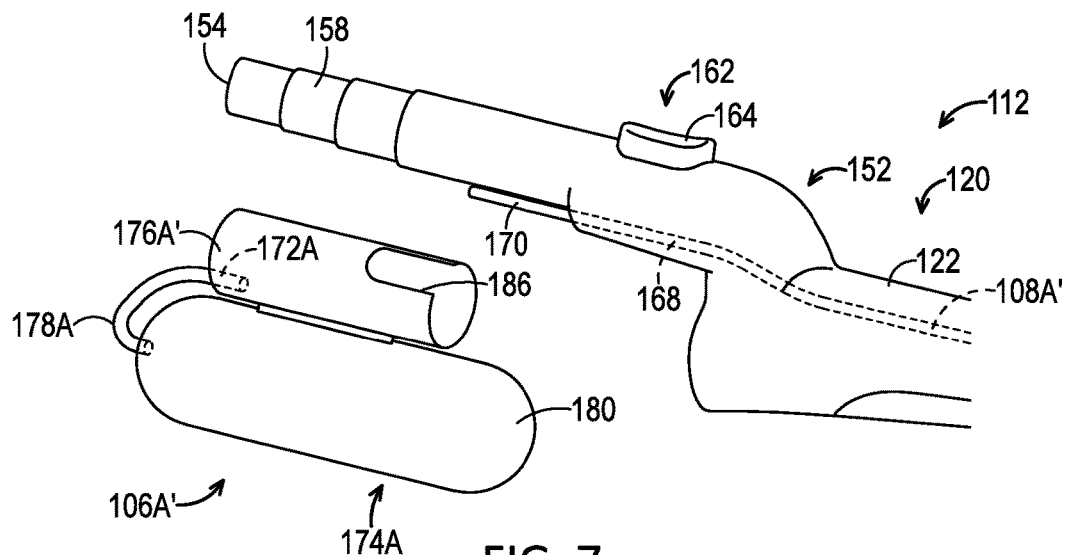
FIG. 7 is an isometric view of the toothbrush and the first irrigation cartridge configuration of toothbrush irrigation system of FIG. 2, depicted in a disassembled configuration.
Figure 8:
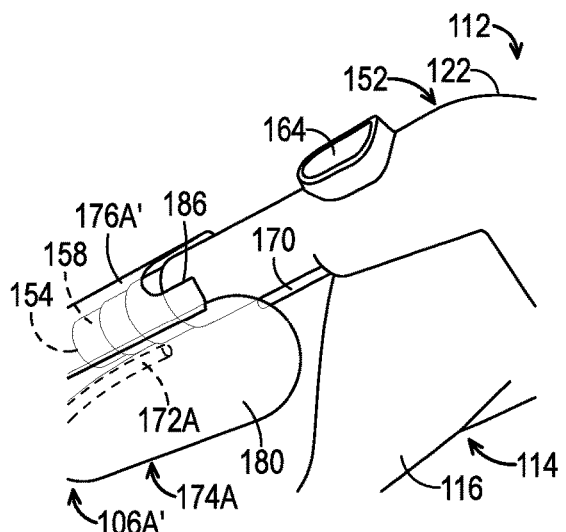
FIG. 8 is an isometric view of the toothbrush irrigation system of FIG. 2, showing an illustrative relationship between components of the toothbrush irrigation system.
Figure 10:
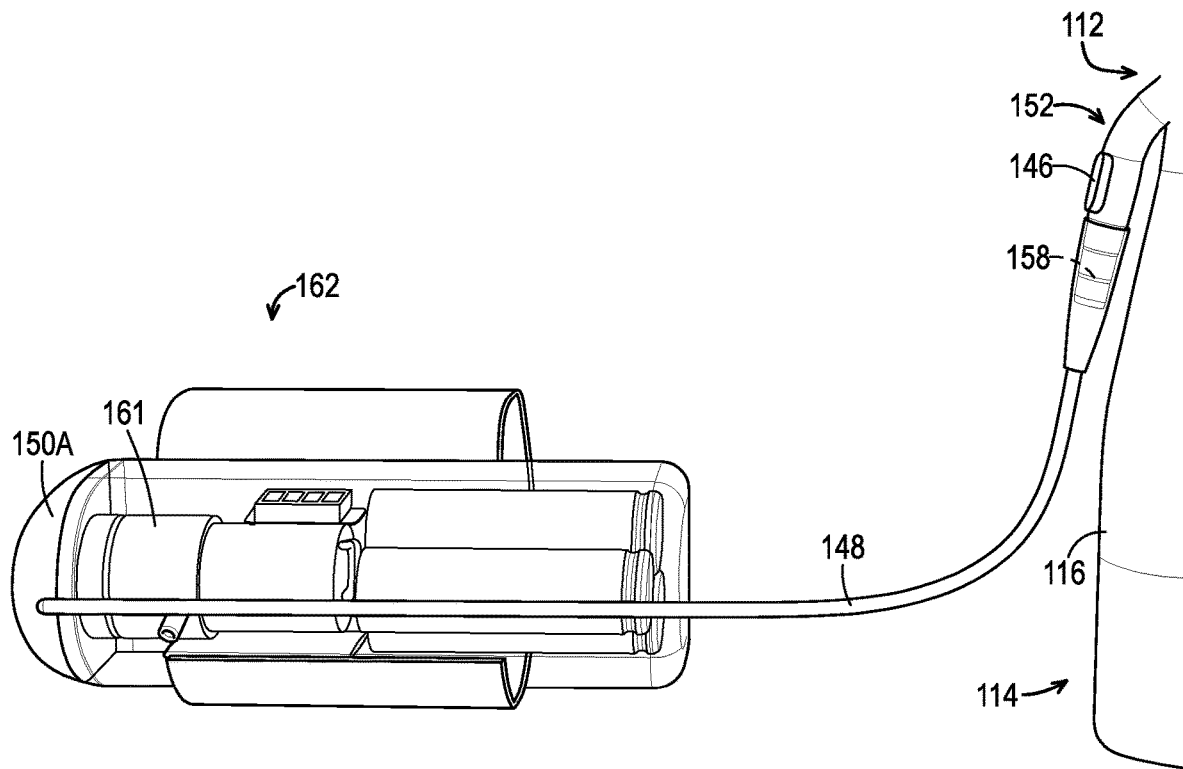
FIG. 10 is an isometric side view of an arm-mounted portion of the tooth cleaning system in accordance with aspects of the present disclosure.

FIG. 2 is an isometric back view of toothbrush irrigation system 100. FIG. 3 is a side view of toothbrush irrigation system 100 and FIG. 4 is a back view of toothbrush irrigation system 100. FIG. 5 is a cross sectional view of toothbrush 102 of toothbrush irrigation system 100. FIGS. 6-8 are isometric side views of the components of an irrigation system 104. FIG. 10 is a side view of an example arm-mounted module which may be coupled to toothbrush 102 to provide suction.

Toothbrush system 100 includes toothbrush 102 and an integrated irrigation system 104. Irrigation system 104 includes an irrigation cartridge 106 having an irrigant fluid reservoir, an irrigation conduit (e.g., an external irrigation tube and/or an at least partially internal irrigation lumen 108), an irrigation exit port 110, and/or an attachment mechanism. In some examples, the attachment mechanism may include a mounting connector and a fluid connector (e.g., external irrigation tube and/or one or more types of nozzles (e.g., mating nozzle, irrigation nozzle, etc.)). As depicted in FIGS. 2-5, Toothbrush 102 includes a head portion 112 coupled to a handle portion 114. The head portion is removably coupled to a housing (AKA body) 116 of the handle portion, such that the head portion is detachable from all electronic components (which are housed in the handle portion) to facilitate cleaning (e.g., using a dishwasher, autoclave, etc.) or disposal. Head portion 112 includes an oscillating toothbrush head 118 coupled to a neck 120. The neck of the head portion is at least partially hollow and comprises an exterior casing 122 that houses components of the head portion such as, a handle coupling port 124, a head drive shaft 126, and/or other components of the oscillating toothbrush head. The exterior casing of neck 120 is coupled on a distal end to a brush head 128 of the oscillating toothbrush head.

Brush head 128 of the oscillating toothbrush head is disposed at a distal end of head portion 112 and includes a plurality (e.g., five) of bristles and/or brushes 130 orientated transverse to an anterior side of toothbrush body 116. The brush head is coupled to a distal end of head drive shaft 126 which is configured to oscillate as controlled by a motor 132 disposed in handle portion 114. Head drive shaft 126 may extend through neck 120 to mechanically and/or electrically couple the plurality of bristles and/or brushes of brush head 128 to the motor.

Handle coupling port 124 is disposed in and/or through a proximal end of neck 120 of head portion 112 and includes a recess 134 configured to receive a mounting boss 136 of the handle portion. The handle coupling port by way of the recess is configured to allow selective coupling and/or decoupling of head portion 112 to and/or from handle portion 114. In some examples, the recess of handle coupling port 124 includes a fastening mechanism (e.g., bayonet fitting, etc.) such as one or more protrusions and/or grooves disposed in a wall of the recess which may mate with corresponding protrusions and/or grooves of the mounting boss to selectively couple and/or decoupled the handle coupling port and the mounting boss.

Mounting boss 136 (AKA mounting protrusion or mounting stub) of handle portion 114 protrudes from a distal end of handle body 116 and is configured to interface with the recess of the handle coupling port of the head portion to selectively couple and/or decouple the handle portion to and/or from the head portion. The mounting boss may include a fastening mechanism (e.g., bayonet fitting, etc.) such as one or more protrusions and/or grooves disposed in a wall of the mounting boss which may mate with corresponding protrusions and/or grooves of the recess of the handle coupling port. In some examples, mounting boss 136 is centrally disposed in the distal end of handle body 116.

The body of the handle portion houses motor 132 and a power supply 138. Mounting boss 136 disposed in the handle body includes a passageway 140 which facilitates an electrical and/or mechanical coupling of the plurality of bristles and/or brushes 130 of oscillating toothbrush head 118 to motor 132 or to another drive system housed in handle body 116. Motor 132 is configured to induce brush agitation in the brush head of the oscillating toothbrush head. Motor 132 may selectively couple with head drive shaft 126 such that mechanical motion produced by the motor can be translated to the brush head by way of the head drive shaft. The motor may include any suitable prime mover configured to rotate and/or oscillate bristles of brush head 128, such as an electric motor (e.g., a brushed DC motor), a human powered oscillator, an inductive motor, a heat-powered motor and/or the like. Motor 132 is powered by power supply 138, which may include one or more batteries. In some examples, power supply 138 includes a plurality of alkaline batteries. In some examples, power supply includes a rechargeable, e.g., lithium-ion battery.

The passageway 140 of the mounting boss facilitates the communication between the head drive shaft and the motor. Specifically, passageway 140 includes a distal opening configured to allow passage of a proximal end of head drive shaft 126 through at least a portion of the passageway. A communication mechanism of the motor may be disposed in or adjacent a proximal opening of the mounting boss passageway, such that, in response to the coupling of head portion to the handle portion, a proximal end of head drive shaft 126 may be disposed in passageway 140 and/or brought into communication with motor 132. Communication between the motor and head drive shaft 126 enables the head drive shaft to provide motion (e.g., oscillating, rotational, vibrational, etc.) to the plurality of bristles and/or brushes 130 of brush head 128.

In some examples, handle portion 114 includes a user interface (UI) 142, e.g., including a plurality of buttons and/or switches disposed on an anterior surface of the handle body 116, which may be configured to switch motor 132 between "on" and "off" states. In some examples, the buttons are configured to switch motor 132 between a variety of oscillation speeds. Handle body 116 may comprise any suitable structural material for use in medical devices, such as plastics, metals, and/or the like. In some examples, the handheld toothbrush may include a resilient grip comprising any suitable material which may be easily sterilized, such as rubber, resilient polymers, and/or the like.

In some examples, handle portion 114 includes one or more lights coupled to the handle body. In some examples, the lights are directed toward brush head 128, such that the lights illuminate the mouth of a patient during use. In some examples, handle portion 114 includes a plurality (e.g., two) LED lights disposed within light housings 144 coupled to an anterior surface of handle body 116. In some examples, light housings 144 are substantially tubular housings disposed around side portions of the LED lights, which direct light emitted by the LED lights parallel to a long axis of the toothbrush. In some examples, the lights are electrically coupled to the plurality of buttons and/or switches of UI 142, which are configured to switch the lights between an "on" state and an "off" state.

The detachable head portion 112 further includes a scavenge port 146 (AKA suction port or suction nozzle or suction intake) disposed in an anterior surface of the exterior casing of neck 120, adjacent brush head 128. Scavenge port 146 is configured to facilitate the intake of waste (e.g., water, bodily fluids, food waste, etc.) from the mouth of a patient into an external scavenge tube 148 connected to a scavenge reservoir or waste container 150. In some examples, scavenge port 146 and the plurality of bristles and/or brushes 130 of brush head 128 extend outward from the exterior casing in the same direction.

Head portion 112 further includes a stem 152 having a waste collection port 154 configured to couple scavenge tube 148 to toothbrush 102. Stem 152 extends away from exterior casing 122 (e.g., at a proximal end). Waste collection port 154 is disposed in a proximal end of stem 152. In some examples, neck 120 and stem 152 may be partially or fully hollow to form a scavenge passageway 156 that extends between scavenge port 146 and waste collection port 154. As such, the scavenge port and the waste collection port are in fluid communication through the neck of head portion 112 via scavenge passageway 156. The waste collection port can include a tube coupling 158 configured to detachably couple scavenge tube 148 to stem 152. Generally, the tube coupling can be any shape or size suitable to receive and/or be coupled to a distal end of scavenge tube 148. In response to the coupling of the head portion and handle portion, stem 152 is disposed adjacent body 116 of the handle portion and may extend down at least a partial length of the body of the handle portion, such that waste collection port 154 and tube coupling 158 are disposed adjacent a central part of handle body 116. The scavenge tube, which acts as the connection between waste collection port 154 and the waste reservoir 150, may include any suitable resilient material configured to be used in medical tubing. In some examples, scavenge tube 148 is detachable from waste collection port 154 and waste reservoir 150 for sanitization purposes.

An external scavenging system 160 using scavenge tube 148 may be coupled to waste collection port 154 to facilitate the intake of waste (e.g., water, bodily fluids, food waste, etc.) from the mouth of a patient into scavenge port 146, for example by suction. In some examples, suction is achieved by connecting scavenge tube 148 coupled to waste collection port 154 to an auxiliary aspiration unit, such as but not limited to a wall-mounted aspiration unit. In some examples, suction is achieved by connecting scavenge tube 148 coupled the waste collection port to a pump 161 located on an arm-mounted module 162 (see FIG. 10). Arm-mounted module 162 may include a scavenge reservoir 150A.

Stem 152 of head portion 112 may additionally include a scavenging system control component 163 configured to allow scavenge system 160 to be selectively engaged by the operator. As depicted in FIG. 2-4, scavenge system control component 163 may include a control aperture 164 that provides an opening in the scavenge pathway (i.e., between the waste collection port and the scavenge port). Control aperture 164 may have any suitable shape or size that corresponds to the curvature of a human finger, so as to allow a user who is grasping the toothbrush handle to selectively cover or uncover the aperture with their finger or thumb to enable or disable suction from the scavenge port to the waste reservoir. As shown in FIG. 4, control aperture 164 of the scavenge system control component is disposed on a posterior surface of stem 152. However, in some examples, the scavenge system control component may be disposed in the stem at any location easily accessible to the user while also holding handle portion 114.

As depicted in FIGS. 5-7, the head portion of the toothbrush may further include an at least partially internal irrigation lumen 108 (AKA internal irrigation lumen) and irrigation exit port 110 disposed in neck 120 and/or in brush head 128. In some examples, the at least partially internal irrigation lumen may comprise an internal channel (e.g., an internal channel 108B) formed in the exterior casing, a metal tube that is insert molded into an internal cavity of the exterior casing (e.g., an insert-molded tube 108A' or 108A"), or an internal channel (e.g., internal irrigation lumen 108C' or 108C") that is formed by welding (e.g., sonic welding) an independent channel to an anterior or a posterior surface of the exterior casing. In some examples, the internal irrigation lumen extends partially or entirely through a length of neck 120 of head portion 112. In the current example, internal irrigation lumen is an insert molded metal tube 108A' having an internal section 168 that extends at least partially through neck 120, coupled to an external section 170 that extends out of the proximal end of the neck adjacent stem 152. External section 170 of insert molded metal tube 166 includes a proximal end configured to be received by a matting nozzle 172A of irrigation cartridge 106A' to allow for fluid communication between an irrigant fluid reservoir 174A of irrigation cartridge 106A' and an internal fluid passageway of the insert molded metal tube 108A'. In some examples, mating nozzle 172A may comprise a funnel form configured to facilitate fluid coupling of the irrigant fluid reservoir and the insert molded metal tube 166.

In some examples, internal section 168 may be coupled on a distal end to irrigation exit port 110 to provide a fluid pathway that puts irrigant fluid reservoir 174A in fluid communication with the irrigation exit port. Irrigation exit port 110 is configured to facilitate the flow of an irrigating fluid from the irrigant fluid reservoir into the mouth of a patient. The irrigation exit port may include a spout coupled to the internal irrigation lumen or may be realized as a distal opening of the internal irrigation lumen that is disposed in the neck of head portion 112. In some examples, irrigation exit port 110 is disposed in exterior casing 122 (e.g., through the anterior or posterior surfaces), in brush head 128, adjacent the brush head, or in any other suitable location. As depicted in FIG. 6 head portion 112 includes an irrigation exit port 110A disposed in brush head 128, the irrigation exit port including an opening disposed in the anterior surface of the brush head (i.e., the surface from which the plurality of bristles and/or brushes 130 transversely extend). Irrigation exit port 110 may be disposed at any location on toothbrush head 118 that allows for fluidly coupling with an irrigation conduit (e.g., internal irrigation lumen 108 and/or an external irrigation tube) and for facilitating the flow of an irrigating fluid into the mouth of a patient.

The irrigation cartridge 106 may include irrigant fluid reservoir 174 and an attachment mechanism comprising a mounting connector 176 (e.g., a mating protrusion, a sleeve, a collar, etc.), and a fluid connector (e.g., external irrigation tube 178 and/or one or more nozzles (e.g., mating nozzle 172, an irrigation nozzle, etc.)). Irrigant fluid reservoir 174 may include one or more sealed, prefilled, and disposable bulbs with a controlled volume. Specifically, the irrigant fluid reservoir is prefilled with a sterile irrigating solution and sealed (e.g., to meet infection control standards and increase shelf life of the cartridge). Irrigant fluid reservoir 174 may be removably coupled to toothbrush 102 by way of mounting connector 176 and/or a coupling connector 182 included in the toothbrush. The mounting and/or coupling connector may include any structure and/or device configured to secure irrigant fluid reservoir 174 to toothbrush 102 and/or to fluidly couple irrigant fluid reservoir 174 to the irrigation conduit.

In some examples, mounting connector 176 includes a structure configured to interface with one or more existing features of the handheld toothbrush such as, waste collection port 154 (e.g., a sleeve 176A'), the handle coupling port 124 (e.g., an insertable collar 176B'), or mounting boss 136.

As shown in FIGS. 6-9, irrigation cartridge 106A' includes irrigant fluid reservoir 174A, sleeve 176A', and an external irrigation tube 178A. The irrigant fluid reservoir 174A of the present disclosure includes a compressible bulb 180. Bulb 180 may have any suitable shape configured to be utilized as described herein, and in the present example has a prolate spheroid shape with a single opening disposed in a proximal end. External irrigation tube 178A is coupled on a first end to the proximal end of bulb 180 over the single opening forming an external fluid pathway extending between bulb 180 and a second end of external irrigation tube 178A. In the present example, the second end of external irrigation tube 178A is configured to receive at least a portion of external section 170 of insert-molded metal tube 108A' to form an irrigation pathway that provides fluid communication from bulb 180 to irrigation exit port 110A by way of external irrigation tube 178A and insert-molded metal tube 108A'. In some examples, the second end of external irrigation tube 178A may include a mating nozzle 172 configured to receive (e.g., a receptacle mating nozzle 172A or 172B) or be received (e.g., insertable mating nozzle 172C) by a proximal end of the internal irrigation lumen 108 or the irrigation exit port 110. In some examples, the second end of external irrigation tube 178A may include an irrigation nozzle 189 configured to disperse irrigating fluid from bulb 180 in a specified direction.

Figure 9:
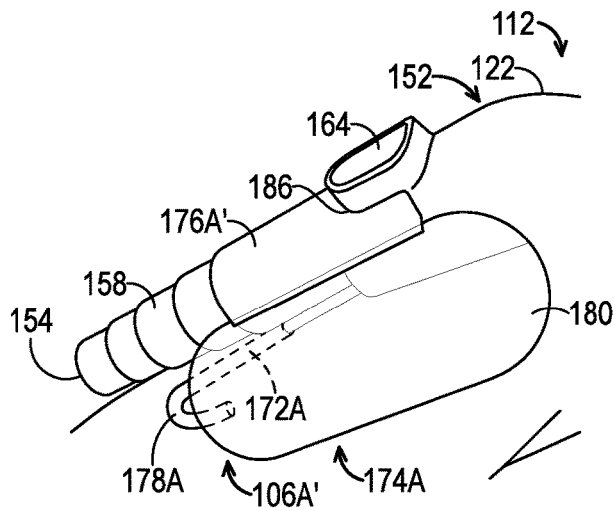
FIG. 9 is an isometric view of the toothbrush irrigation system of FIG. 2, depicting an example attachment mechanism mounted to a toothbrush in accordance with aspects of the present disclosure.

As depicted in FIGS. 7-9, the mounting connector is sleeve 176A' fixedly coupled to bulb 180 along an outer side of the bulb. Sleeve 176A' is configured to slip over a proximal end of stem 152 and/or the waste collection port 154 to secure irrigation cartridge 106 to a mid-section of the stem of head portion 112. Sleeve 176A' includes a slot 186 disposed through a distal end of the sleeve, the slot having a shape configured to receive control aperture 164 in response to the sleeve being pulled up over the stem. In the current example, in response to sleeve 176A' being pulled over the stem, bulb 180 is disposed adjacent control aperture 164, and irrigant fluid reservoir 174 is fluidly coupled to internal irrigation lumen 108.

B. Illustrative Toothbrush Components and Examples

As shown in FIGS. 11-54, this section describes several examples of various components of the toothbrush systems 100 described above, such as irrigation cartridge 106, head portion 112, and handle portion 114. These components are interchangeable with the corresponding components of system 100 described above.

Figure 11:
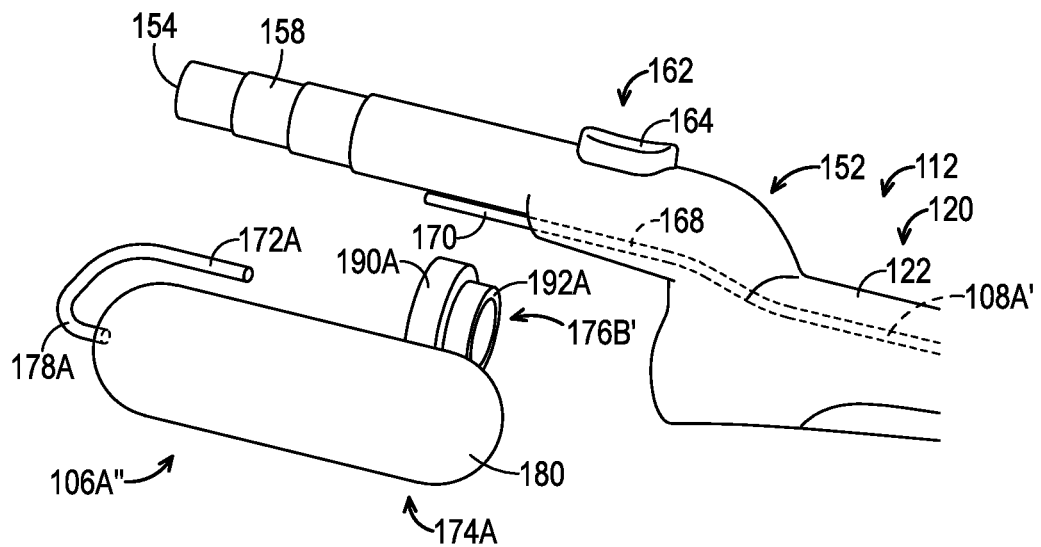
FIG. 11 is an isometric view of the toothbrush of toothbrush irrigation system of FIG. 2, and a second configuration of an irrigation cartridge in accordance with aspects of the present disclosure, depicted in a disassembled configuration.
Figure 12:
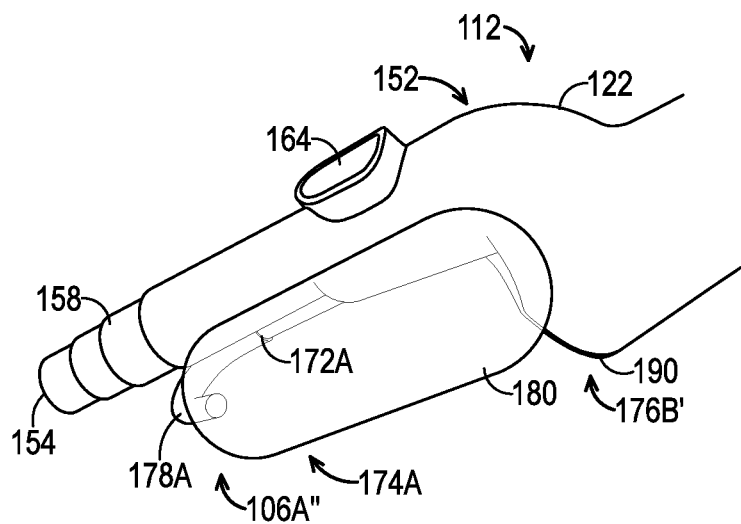
FIG. 12 is an isometric view of the second irrigation cartridge configuration mounted to the toothbrush of toothbrush irrigation system of FIG. 2, in accordance with aspects of the present disclosure.

FIGS. 11-17 depict examples of irrigation cartridge 106. Each of the example cartridges in FIGS. 11-17 may be used as a replacement for cartridge 106 described above. In FIGS. 11-12, irrigation cartridge 106A" includes irrigant fluid reservoir 174A, external irrigation tube 178A, and a mounting connector. In this example, the mounting connector is insertable collar 176B' fixedly coupled to a distal end of the outer side of bulb 180. Insertable collar 176B' includes a flange 190A shaped in a similar manner to a shape of the proximal end of head portion 112 and a secondary mounting boss 192A protruding from a top surface of the flange. Secondary mounting boss 192A includes an external surface configured to interface with the recess of handle coupling port 124 and an internal channel having an internal surface configured to receive mounting boss 136 of handle portion 114. As depicted in FIG. 11, insertable collar 176B' is configured to be inserted into and interface with handle coupling port 124 to secure irrigation cartridge 106' to detachable head portion 112. In response to the insertable collar being received by the handle coupling port, bulb 180 is disposed adjacent stem 152.

Figure 13:
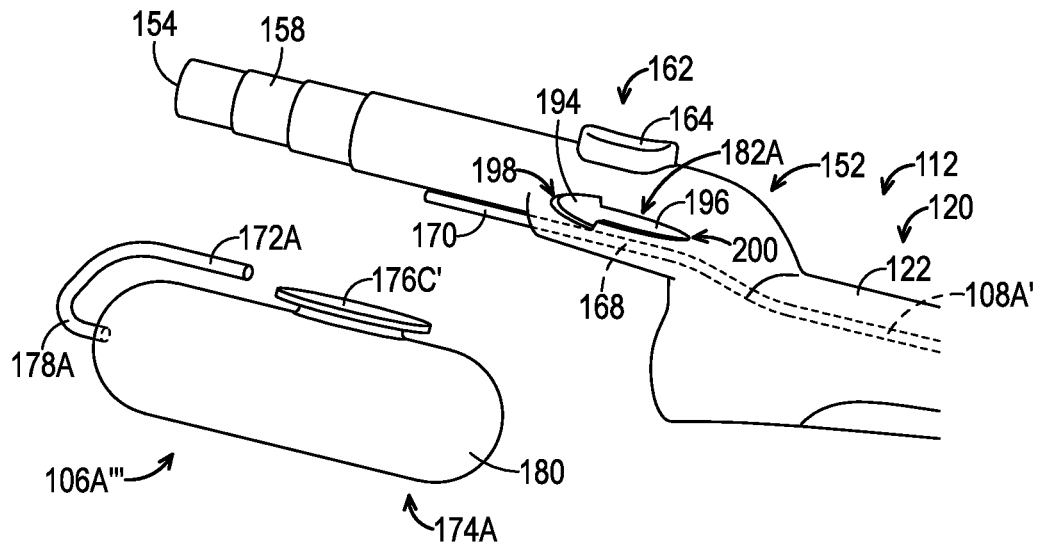
FIG. 13 is an isometric view of the toothbrush of toothbrush irrigation system of FIG. 2, and a third configuration of an irrigation cartridge in accordance with aspects of the present disclosure, depicted in a disassembled configuration.
Figure 14:
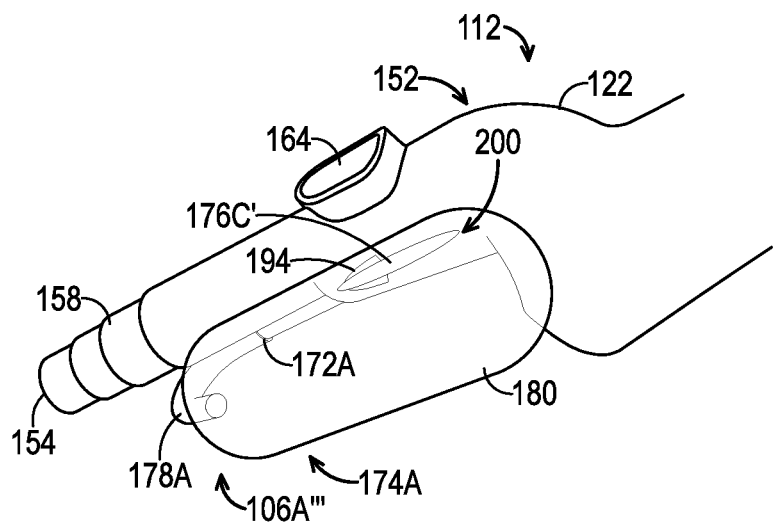
FIG. 14 is an isometric view of the third irrigation cartridge configuration mounted to the toothbrush of toothbrush irrigation system of FIG. 2, in accordance with aspects of the present disclosure.

In some examples, toothbrush 102 includes a coupling connector 182 (e.g., a keyhole slot and recess coupling connector 182A, a cradle 182B, etc.) disposed in head portion 112. In the example of FIGS. 13-14, an irrigation cartridge 106A''' includes irrigant fluid reservoir 174A, external irrigation tube 178A, and a mounting connector. Coupling connector 182 includes one or more protrusions and/or recesses configured to securely receive irrigant fluid reservoir 174A and/or to interlock with the mounting connector of irrigation cartridge 106A'''. For example, as shown in FIGS. 13-14, head portion 112 includes a coupling connector 182A disposed in stem 152. Coupling connector 182A includes a recess 194 disposed through a side of the stem with a keyhole slot 196 disposed over the recess opening. In this example, the mounting connector is a mating protrusion 176C' configured to interlock with the keyhole slot of coupling connector 182A. Mating protrusion 176C' is fixedly coupled to bulb 180 along an outer side of the bulb. Recess 194 and/or keyhole slot 196 are configured to receive and/or interlock with mating protrusion 176C' to securely couple irrigation cartridge 106A''' to the detachable head portion. Specifically, keyhole slot 196 includes a hole at a first end configured to allow insertion of mating protrusion 176C' into recess 194 through a first end of the slot 198, and a narrow slot extending from the hole to a second end 200 of the slot. Second end 200 of slot 196 is configured to arrest removal of mating protrusion 176C' in response to the mating protrusion being disposed at the second end of the slot. In response to inserting mating protrusion 176C' into recess 194 and sliding the mating protrusion through slot 196 from the first end to the second end, coupling connector 182A and mating protrusion 176C' are interlocked and accordingly prevent inadvertent uncoupling of the cartridge and head portion.

Figure 15:
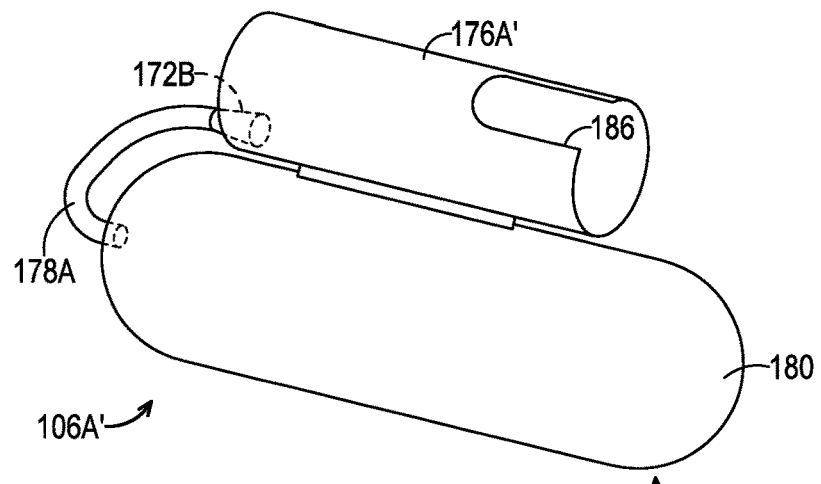
FIG. 15 is an isometric view of the first irrigation cartridge configuration having a funnel form matting nozzle, in accordance with aspects of the present disclosure.
Figure 16:
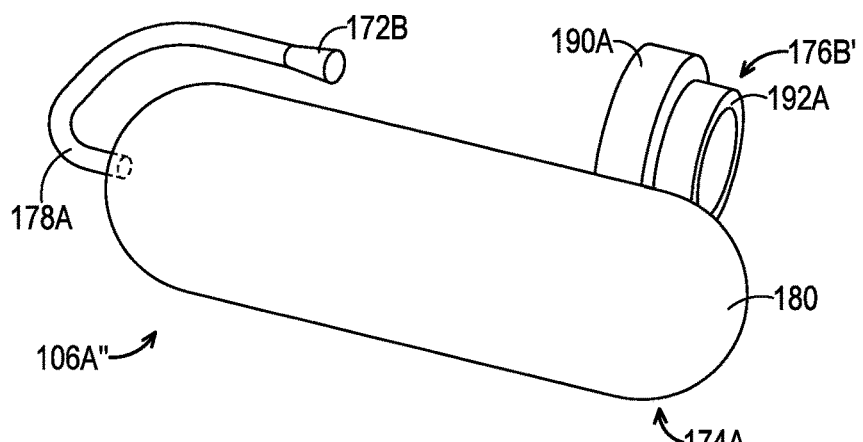
FIG. 16 is an isometric view of the second irrigation cartridge configuration having a funnel form matting nozzle, in accordance with aspects of the present disclosure.
Figure 17:
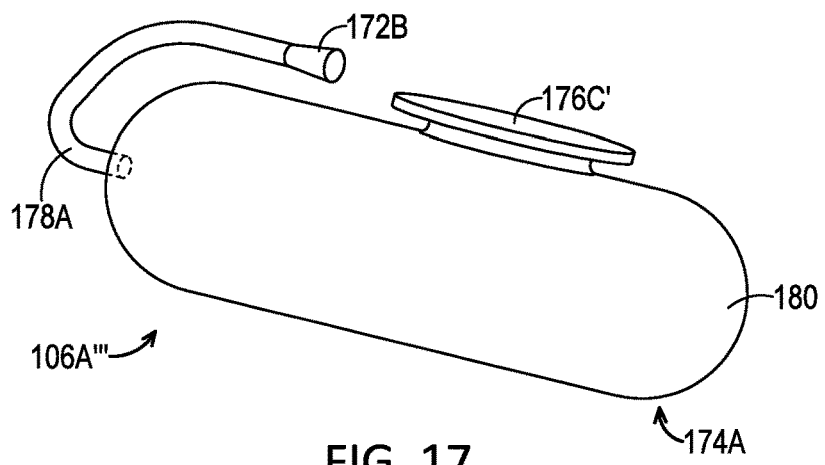
FIG. 17 is an isometric view of the third irrigation cartridge configuration having a funnel form matting nozzle, in accordance with aspects of the present disclosure.

FIGS. 15-17 depict the various examples of irrigation cartridge 106A (e.g., 106A', 106A", 106A''') including matting nozzle 172B. Mating nozzle 172B has a funnel form configured to facilitate the fluid coupling of irrigant fluid reservoir 174A and insert-molded metal tube 108A'. FIG. 15 depicts irrigation cartridge 106A' including mating nozzle 172B. FIG. 16 depicts an example irrigation cartridge 106A''' including insertable collar 176B' and matting nozzle 172B. FIG. 17 depicts an example of irrigation cartridge 106A" with matting protrusion 176C' and matting nozzle 172B.

Figure 18:
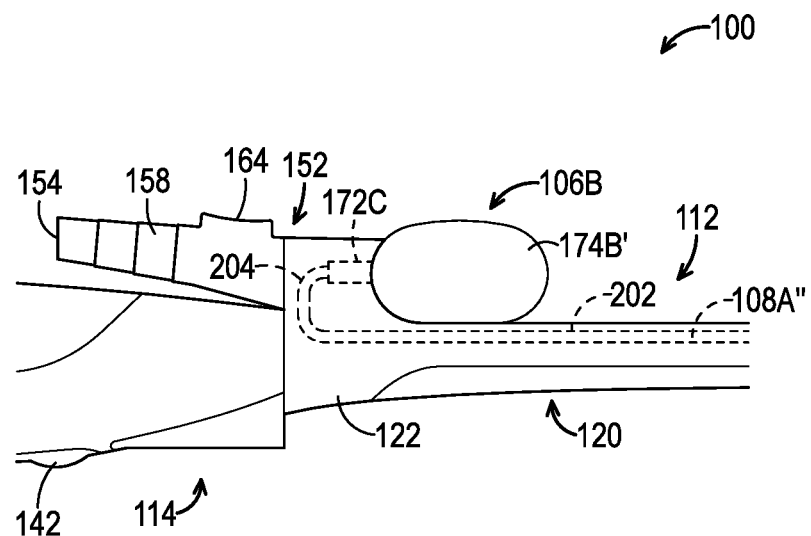
FIG. 18 is a side view of another illustrative toothbrush irrigation system in accordance with aspects of the present disclosure.
Figure 19:
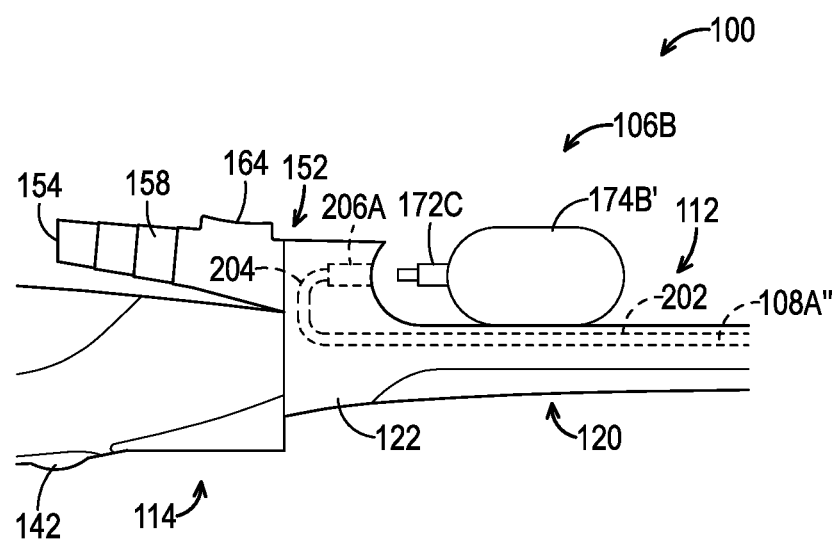
FIG. 19 is a side view of the toothbrush irrigation system of FIG. 18, and a fourth configuration of an irrigation cartridge in accordance with aspects of the present disclosure, depicted in a disassembled configuration.

In the example of FIGS. 18-19, the at least partially internal irrigation lumen 108 is alternatively an insert-molded metal tube 108A" having a straight segment 202 and a curved segment 204 both disposed internal in relation to the exterior casing of head portion 112. Insert-molded metal tube 108A" is disposed in the hollow cavity of the neck and/or stem of head portion 112. In some examples, insert-molded metal tube 108A" extends through the scavenge pathway 156 formed in the hollow cavity of the neck and/or stem. Insert-molded metal tube 166' includes straight segment 202 that extends at least partially through the length of neck 120, and couples on a proximal end to a second end of curved segment 204. In this example, irrigation system 104 of toothbrush irrigation system 100 alternatively includes an irrigation cartridge 106B' which is an example of irrigation cartridge 106. Irrigation cartridge 106B' includes irrigant fluid reservoir 174B (AKA bulb) and an insertable mating nozzle 172C disposed in the proximal end of the bulb (e.g., centered thereon). The insertable mating nozzle is configured to facilitate fluid communication between bulb 174B' and insert-molded tube 108A".

As depicted in the example of FIGS. 18-19, head portion 112 may include a coupling connector 182. In this example, The coupling connector is a cradle 182B'. Cradle 182B' may be disposed in the posterior surface of the exterior casing and/or a distal end of stem 152 (i.e., where the stem protrudes from exterior casing 122). The cradle may include a curved recess flanked by one or more protrusions (e.g., on a proximal and/or distal end, on an anterior and/or posterior side) configured to securely receive irrigation cartridge 106B'. Cradle 182B' includes a curved recess disposed in the distal end of stem 152 (i.e., where the stem protrudes from exterior casing 122), the curved recess configured to securely receive a proximal end of bulb 174B'. Cradle 182B' further includes a guiding wall formed from the posterior surface of the exterior casing which forms an anterior side of the curved recess. Cradle 182B' further includes a reservoir nozzle receiving port 206A disposed in the curved recess (e.g., centered thereon), and configured to receive and couple insertable mating nozzle 172C of cartridge 106B'.

Curved segment 204 is disposed in the neck and/or the stem and extends from the proximal end of straight segment 202 to couple on a first end to reservoir nozzle receiving port 206A. Curved segment 204 is configured to provide fluid communication between insertable mating nozzle 172C of cartridge 106B' and straight segment 202 of insert-molded metal tube 108A" by way of reservoir nozzle receiving port 206A. In some examples, a distal end of the straight segment of insert-molded metal tube 108A" is coupled to irrigation exit port 110, such that a fluid pathway is formed extending between the fluid reservoir of cartridge 106B' and the irrigation exit port.

Figure 20:
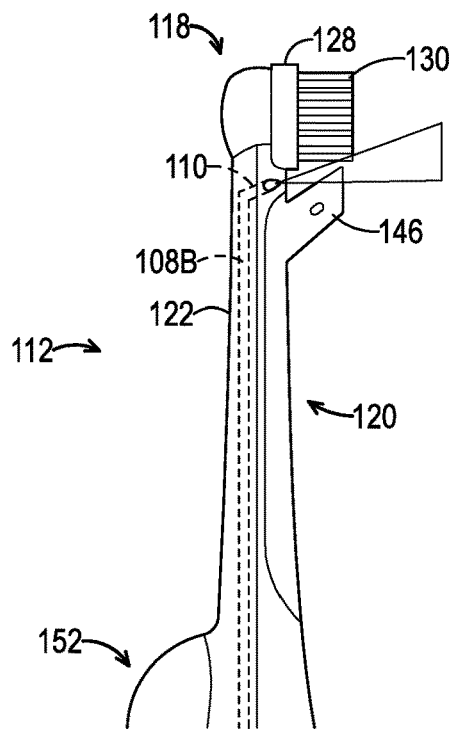
FIG. 20 is a side view of a second toothbrush head portion of yet another illustrative toothbrush irrigation, in accordance with aspects of the present disclosure.
Figure 21:
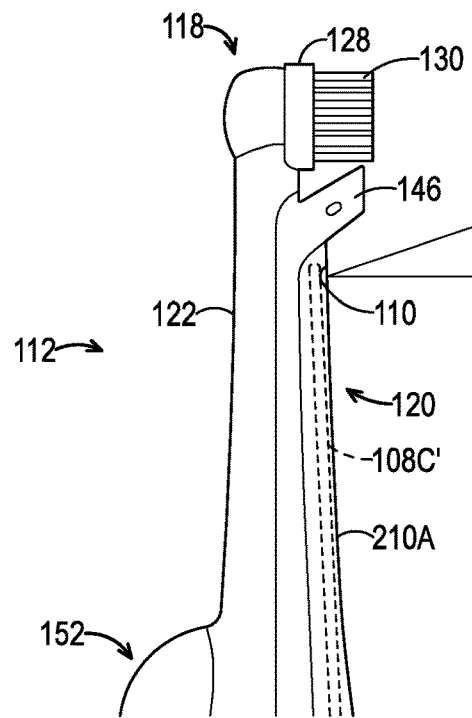
FIG. 21 is a side view of a third toothbrush head portion of yet another illustrative toothbrush irrigation, in accordance with aspects of the present disclosure.
Figure 22:
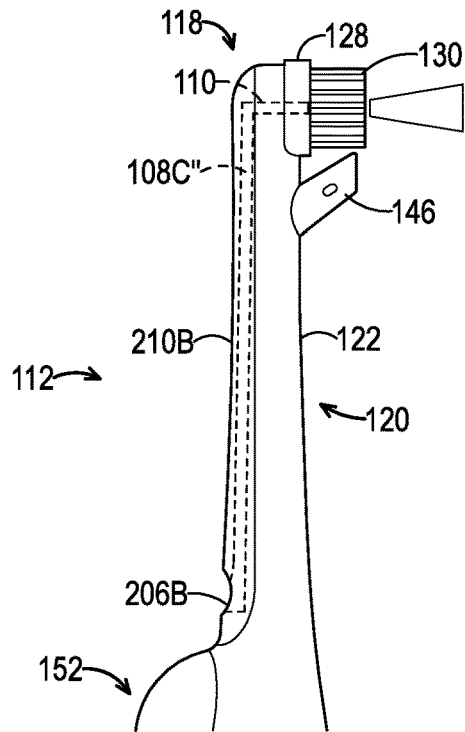
FIG. 22 is a side view of a fourth toothbrush head portion of yet another illustrative toothbrush irrigation, in accordance with aspects of the present disclosure.
Figure 23:
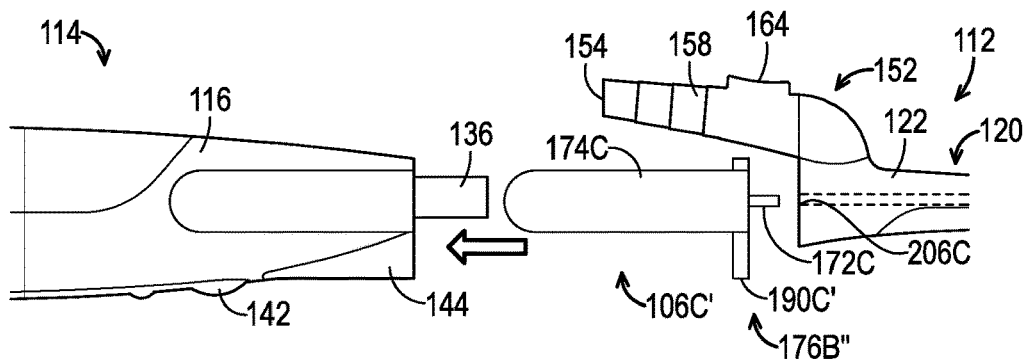
FIG. 23 is a side view of the toothbrush of toothbrush irrigation system of FIG. 20, and a fourth configuration of an irrigation cartridge in accordance with aspects of the present disclosure, depicted in a disassembled configuration.
Figure 24:
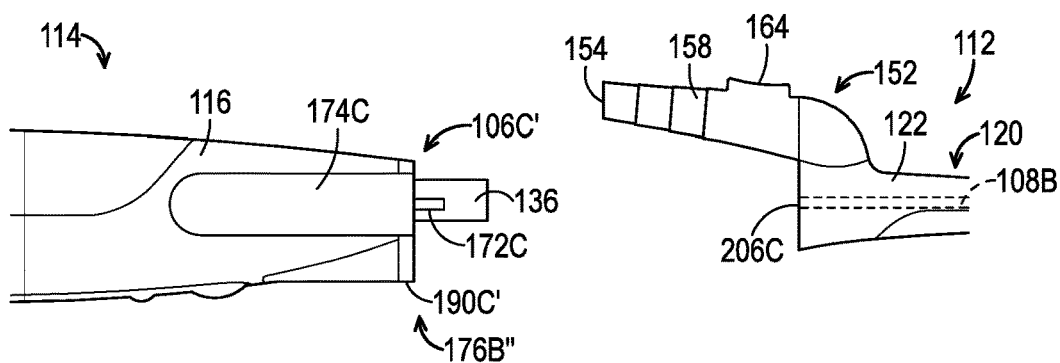
FIG. 24 is a side view of the fourth irrigation cartridge configuration mounted to a mounting boss of the toothbrush of FIG. 23, in accordance with aspects of the present disclosure.
Figure 25:
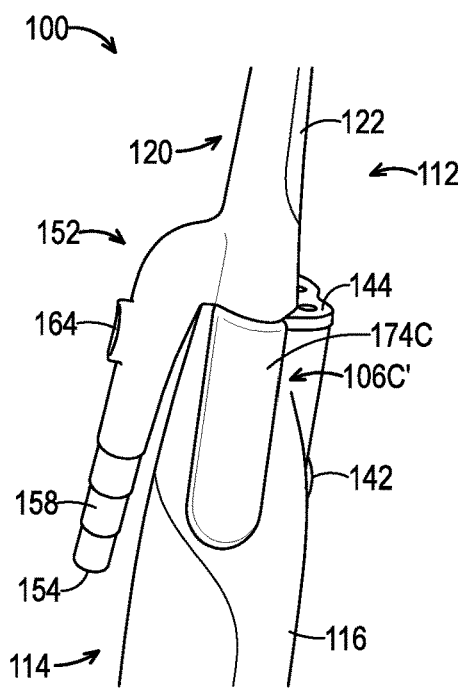
FIG. 25 is an isometric side view of the toothbrush irrigation system of FIG. 23, depicting the irrigation system in an assembled configuration.
Figure 26:
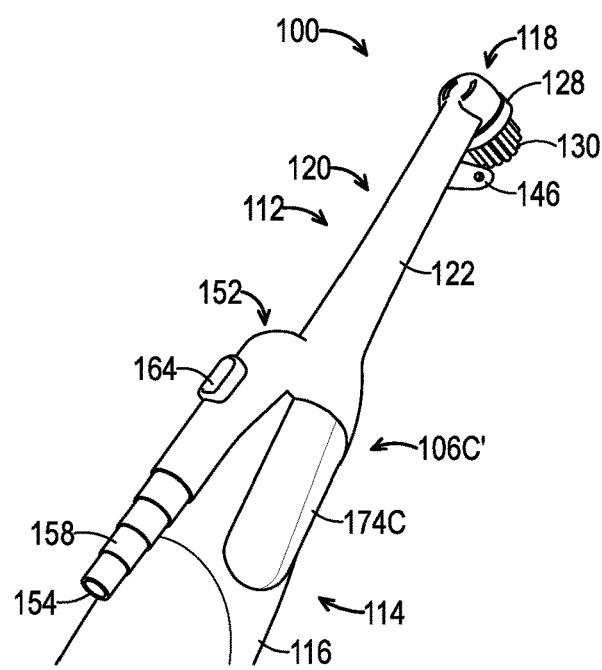
FIG. 26 is an isometric back view of the toothbrush irrigation system of FIG. 23, depicting the irrigation system in an assembled configuration.
Figure 27:
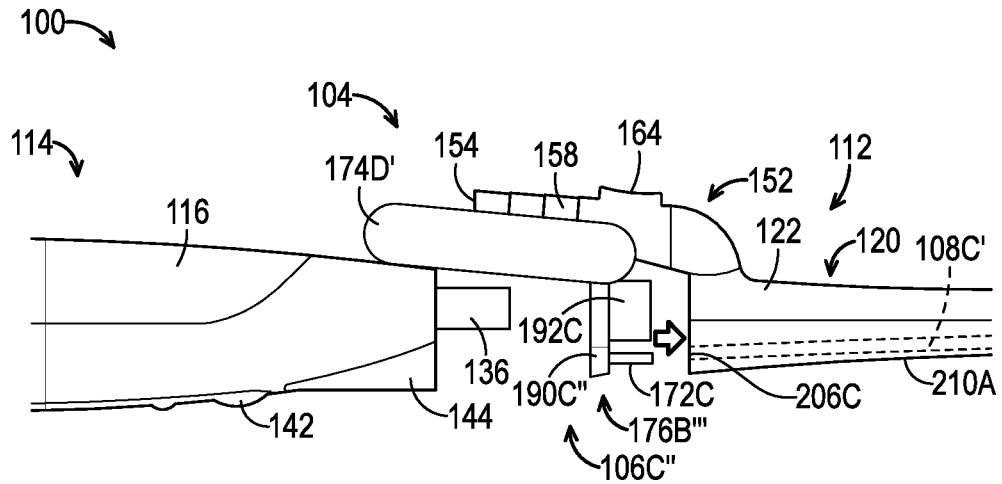
FIG. 27 is a side view of the toothbrush of toothbrush irrigation system of FIG. 21, and a fifth configuration of an irrigation cartridge in accordance with aspects of the present disclosure, depicted in a disassembled configuration.
Figure 28:
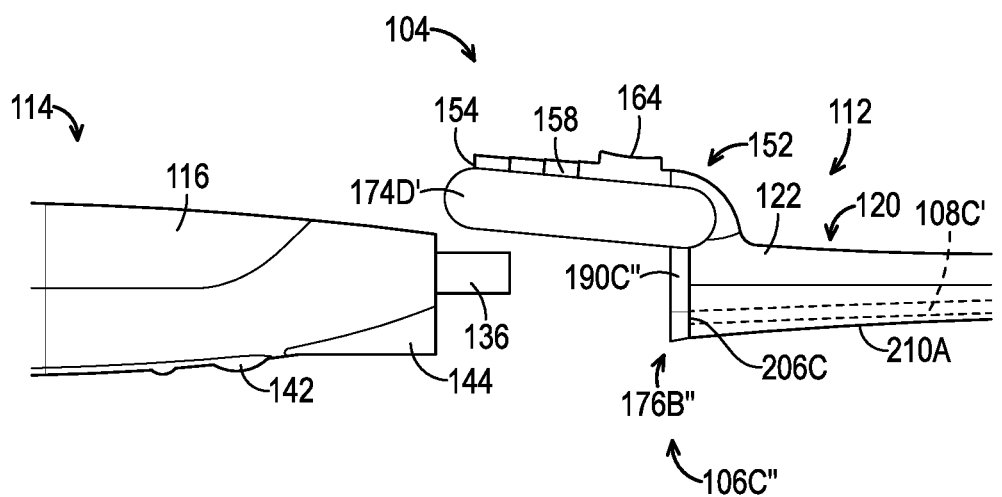
FIG. 28 is a side view of the firth irrigation cartridge configuration mounted to the third toothbrush head portion of FIG. 21, in accordance with aspects of the present disclosure.

In the examples of FIGS. 20-22, the at least partially internal irrigation lumen (AKA internal irrigation lumen) is alternatively an internal channel 108B' formed in and/or with exterior casing 122. FIGS. 20 and 23-26 depict an example of head portion 112 having an internal irrigation lumen including an internal channel 108B' formed in a side of the exterior casing of neck 120. Internal channel 108B' may extend within the exterior casing from a proximal end of head portion 112 to an irrigation exit port 110. In some examples, internal channel 108B' includes a reservoir nozzle receiving port 206C disposed in and/or through a proximal end of the exterior casing. FIGS. 21 and 27-28 depict an example head portion 112 having an internal irrigation lumen 108C' formed by an independent channel 210A welded to an anterior surface of the exterior casing along a length of neck 120. Independent channel 210A may include one or more exterior walls that together with the anterior surface of the exterior casing form internal irrigation lumen 108C'. Independent channel 210A may include a reservoir nozzle receiving port 206B disposed at a proximal end, and/or an irrigation exit port 110 disposed at a distal end. FIGS. 22 and 29-31 depict an example head portion 112 having an internal irrigation lumen 108C" including an independent channel 210B welded to a posterior surface of the exterior casing of neck 120. Independent channel 210B may include one or more exterior walls that together with the posterior surface of exterior casing 122 form internal irrigation lumen 108C". Independent channel 210B may include a reservoir nozzle receiving port 206B disposed in a posterior surface of the independent channel. In some examples, reservoir nozzle receiving port 206B may comprise a funnel form configured to facilitate the insertion of an insertable mating nozzle 172C.

FIGS. 23-26 depict irrigation system 104 of toothbrush irrigation system 100 alternatively including an irrigation cartridge 106C'. Irrigation cartridge 106C' includes an irrigant fluid reservoir 174C, a mounting connector 176B", and an insertable mating nozzle 172C. Irrigant fluid reservoir 174C includes one compressible bulb having a generally capsule shape but with a substantially flat distal end. Insertable mating nozzle 172C is disposed in the substantially flat distal end of the bulb of irrigant fluid reservoir 174C (e.g., centered thereon), such that the insertable nozzle extends from a center of the substantially flat distal end of the bulb. Insertable nozzle 172C is configured to interface with a reservoir nozzle receiving port 206C of the internal channel 108B. Mounting connector 176B" is fixedly coupled to a side of the distal end of irrigant fluid reservoir 174C. Mounting connector 176B" includes a flange 190C', shaped in a similar manner to a shape of the proximal end of head portion 112 and having a central aperture configured to receive mounting boss 136 of handle portion 114. As such, mounting connector 176B" is configured to securely couple irrigation cartridge 106C' to handle portion 114.

In some examples, handle portion 114 of toothbrush 102 further includes a mounting recess configured to securely receive at least a portion of an irrigant fluid reservoir 174C. For example, as depicted in FIGS. 23-26, handle portion 114 of toothbrush 102 may additionally include a mounting recess 208 configured to receive at least a portion of irrigant fluid reservoir 174C. Recess 208 may be disposed in a distal end of handle body 116 adjacent light housings 144, and/or in any other suitable place. In some examples, the recess is disposed in and/or through the distal end and or a side of the handle body. In the example of FIGS. 23-26, internal irrigation lumen 108B is disposed in a side of exterior casing 122. Internal irrigation lumen 108B may be disposed at any suitable location that allows for coupling of insertable mating nozzle 172C and reservoir nozzle receiving port 206C in response to irrigant fluid reservoir 174C being received in recess 208 and the coupling of head portion 112 and handle portion 114.

The example of FIGS. 27-28, alternatively depict irrigation system 104 of toothbrush irrigation system 100 including an irrigation cartridge 106C'". Irrigation cartridge 106C'" includes an irrigant fluid reservoir 174D', a mounting connector, and an insertable mating nozzle 172C. Irrigant fluid reservoir 174D' includes a compressible bulb having a capsule shape and an opening disposed in a side of the bulb adjacent a distal end of the bulb. In this example, the mounting connector is an insertable collar 176B'" configured to be inserted into and interface with handle coupling port 124 to secure irrigation cartridge 106C'" to the detachable head portion. Insertable collar 176B'" includes a flange 190C" shaped in a similar manner to a shape of the proximal end of head portion 112, insertable matting nozzle 172C, and secondary mounting boss 192C, the insertable matting nozzle and secondary mounting boss protruding from a top surface of flange 190C". Secondary mounting boss 192C includes an external surface configured to interface with the recess of handle coupling port 124 and an internal channel having an internal surface configured to receive mounting boss 136 of the handle portion 114. Flange 190C" is coupled to irrigant fluid reservoir 174D' over the opening in the bulb. Insertable collar 176B'" further includes an intermediate fluid passageway disposed in flange 190C" and extending between the insertable mating nozzle 172C and the opening in the bulb to provide a fluid pathway between irrigant fluid reservoir 174D' and insertable mating nozzle 172C. Insertable mating nozzle 172C may be disposed on flange 190C" in any suitable location that allows for coupling of the insertable mating nozzle and reservoir nozzle receiving port 206C in response to mounting connector 176B" being received in the handle coupling port.

Figure 29:
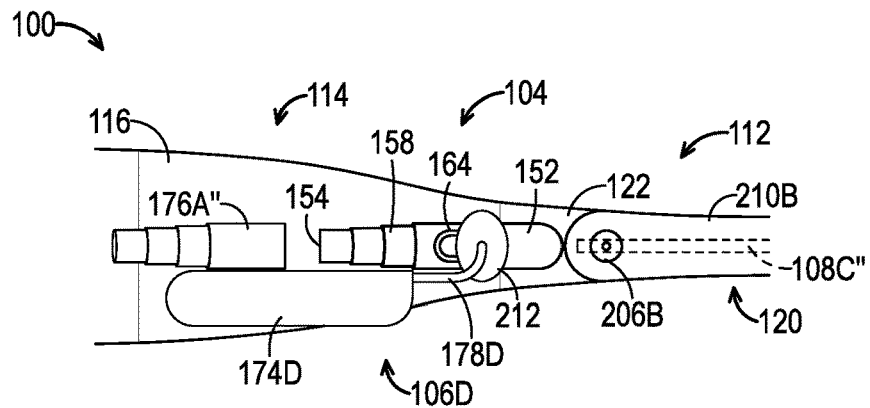
FIG. 29 is a rear view of the toothbrush of toothbrush irrigation system of FIG. 22, and a sixth configuration of an irrigation cartridge in accordance with aspects of the present disclosure, depicted in a disassembled configuration.
Figure 30:
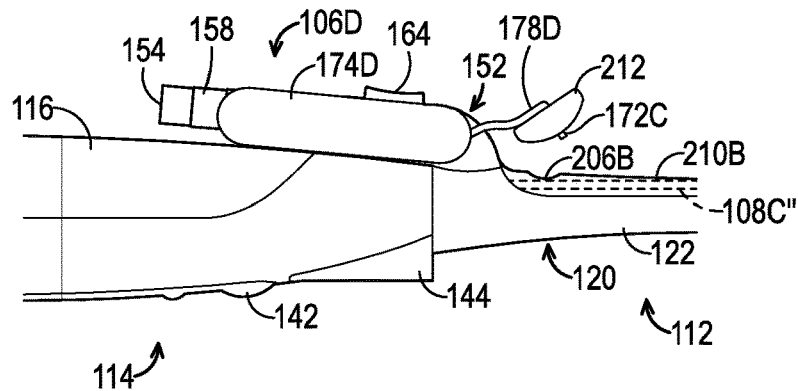
FIG. 30 is a side view of the sixth irrigation cartridge configuration partially mounted to the fourth toothbrush head portion of FIG. 22, in accordance with aspects of the present disclosure.
Figure 31:
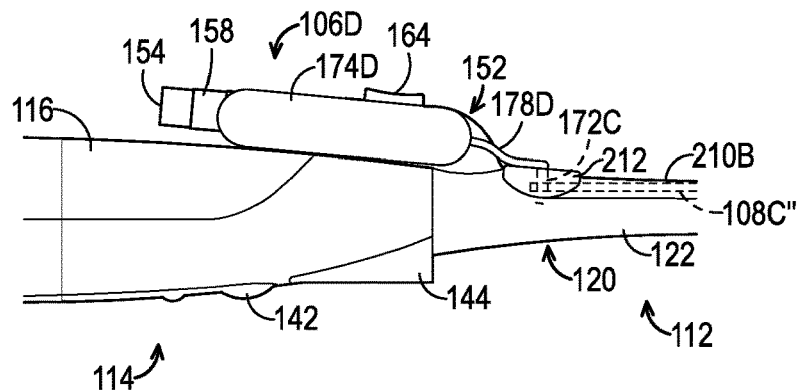
FIG. 31 is a side view of the sixth irrigation cartridge configuration mounted to the fourth toothbrush head portion of FIG. 22, in accordance with aspects of the present disclosure.

The example of FIGS. 29-31, alternatively depict irrigation system 104 of toothbrush irrigation system 100 including an irrigation cartridge 106D. Irrigation cartridge 106D includes an irrigant fluid reservoir 174D, a mounting connector 176A", an external irrigation tube 178D, and an insertable mating nozzle 172C. Irrigant fluid reservoir 174D includes a compressible bulb having a capsule shape but with an at least one substantially flat edge disposed at the distal end. External irrigation tube 178D is disposed at a distal end of the bulb (e.g., offset from the center, centered thereon, etc.), such that external irrigation tube 178D extends from a periphery of the distal end of the bulb. In this example, insertable mating nozzle 172C is disposed at a distal end of external irrigation tube. Additionally, a molded mating surface 212 is disposed at a proximal end of insertable matting nozzle 172C, closer to irrigant fluid reservoir 174D and further from the distal end of external irrigation tube 178D. Molded mating surface 212 includes a flexible molded surface configured to act as a suction cup.

As depicted in FIGS. 29-30, reservoir nozzle receiving port 206B includes a funnel form configured to facilitate the insertion of insertable matting nozzle 172C into internal irrigation lumen 108C". As shown in FIG. 31, molded mating surface 212 is configured to produce a suction fastening together with the funnel form of the reservoir nozzle receiving port in response to a user pushing the insertable matting nozzle fully into reservoir nozzle receiving port 206B. The suction fastening produced by the molded mating surface 212 and reservoir nozzle receiving port 206B prevent inadvertent uncoupling of the insertable matting nozzle and internal channel 108C".

Internal irrigation lumen 108 may be coupled to irrigation exit port 110 to provide a fluid pathway that puts irrigant fluid reservoir 174 in fluid communication with the irrigation exit port. Irrigation exit port 110 may be disposed at any suitable location in head portion 112. As depicted in FIGS. 32-36, irrigation exit port 110 may be disposed in the brush head (e.g., 110A of FIG. 32, or 110E of FIG. 36), in the anterior surface of the exterior casing (e.g., 110B of FIG. 33, or 110C of FIG. 34), in the posterior surface of the exterior casing (e.g., 110D of FIG. 35), and/or in any other suitable location. Irrigation exit port 110 is configured to facilitate the flow of an irrigating fluid from irrigant fluid reservoir 174 into the mouth of a patient. The irrigation exit port may include a spout coupled to the irrigation conduit or may be realized as a distal opening of the irrigation conduit that is disposed in the neck of the head portion. In some examples, the irrigation exit port is configured to spray irrigating liquid upwards from the distal end of the head portion or a posterior surface of the head portion. In some examples, irrigation exit port 110 is configured to disperse irrigating liquid in a forward direction from an anterior surface of head portion 112.

In some examples, irrigation system 104 of toothbrush irrigation system 100 includes an external irrigation tube 178E as the irrigation conduit. External irrigation tube 178E is configured to couple to an exterior surface of toothbrush 102 and provide fluid communication between the irrigant fluid reservoir and a distal end of head portion 112 and/or an external irrigation exit port (see FIGS. 54-55). In the examples of FIGS. 37-55, head portion 112 of toothbrush 102 does not include an internal irrigation lumen 108 disposed in exterior casing 122. As such, the examples of FIGS. 37-45 depict an irrigation cartridge 106E (FIGS. 37-39 and 41-45) or 106F (FIG. 40) configured to be removably coupled to head portion 312 to provide an external irrigation pathway to toothbrush 102.

FIGS. 37-39 and 41-45 depict various examples of irrigation cartridge 106E which is substantially identical to irrigation cartridge 106, except as described below. Irrigation cartridge 106E includes an irrigant fluid reservoir, one or more mounting connectors, external irrigation tube 178E, and/or fluid connector (e.g., a matting nozzle 188, an irrigation nozzle 189, etc.)

Figure 37:
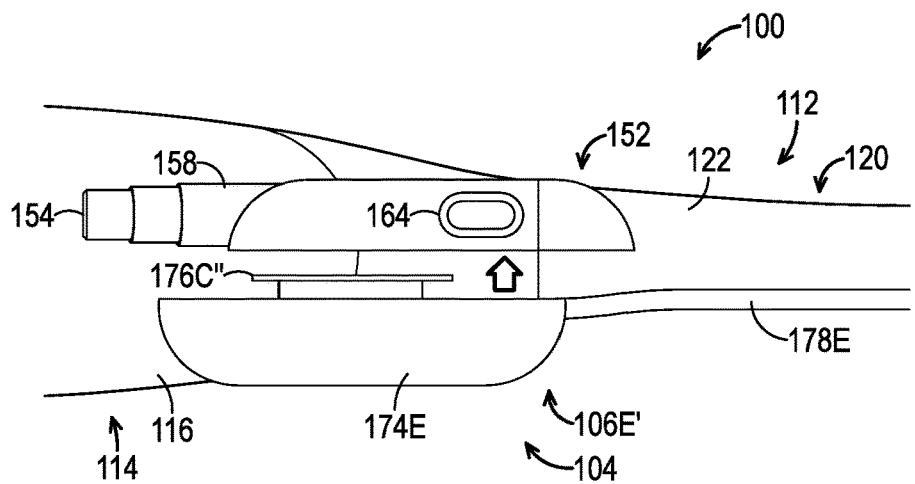
FIG. 37 is a rear view of a toothbrush of yet another illustrative toothbrush irrigation system having a toothbrush and a seventh configuration of an irrigation cartridge in accordance with aspects of the present disclosure, depicted in a disassembled configuration.
Figure 38:
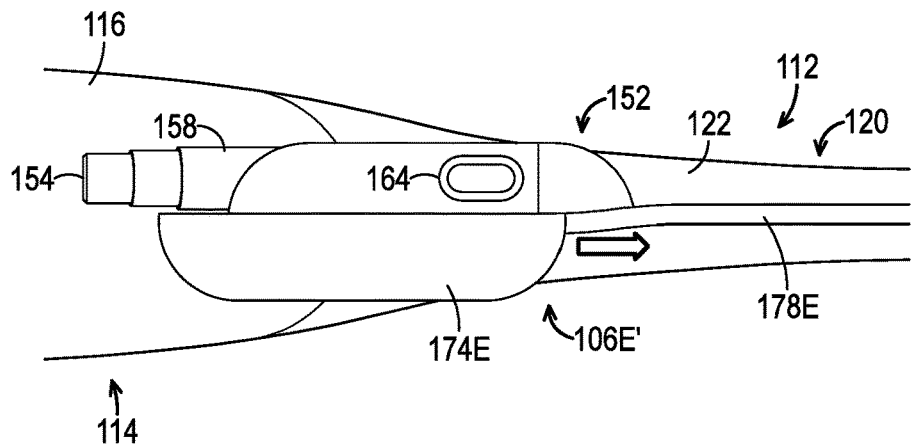
FIG. 38 is a rear view of the toothbrush irrigation system of FIG. 37, showing an illustrative interaction between the toothbrush and seventh irrigation cartridge configuration, in accordance with aspects of the present disclosure.
Figure 39:
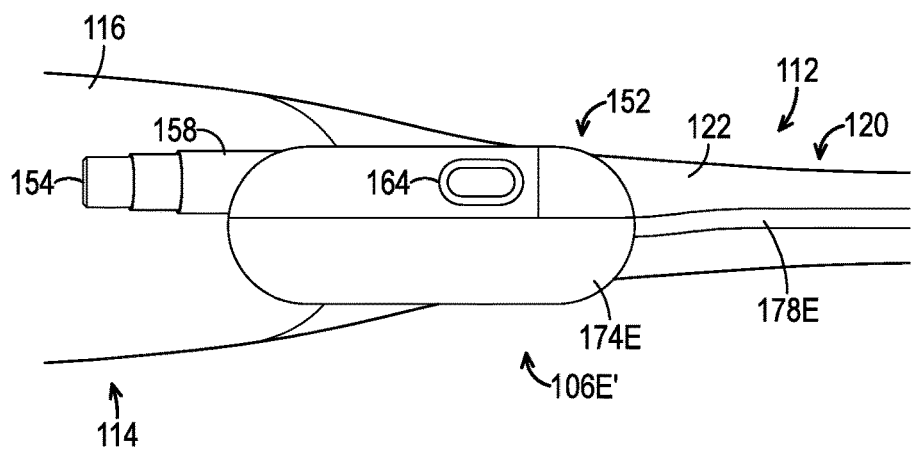
FIG. 39 is a rear view of the seventh irrigation cartridge configuration mounted to the toothbrush of the toothbrush irrigation system, in accordance with aspects of the present disclosure.

The toothbrush system depicted in FIGS. 37-39 is substantially identical to the toothbrush system example of FIGS. 13-14, except that irrigation system 104 includes an irrigation cartridge 106E' which is an example of irrigation 106E discussed above. Irrigation cartridge 106E' includes external irrigation tube 178E having a distal end configured to externally couple to a distal end of head portion 112 or to an external irrigation exit port. In this example, irrigation cartridge includes a mating protrusion 176C", and head portion 112 of toothbrush 102 includes a coupling connector 182A including a recess 194 disposed in stem 152 and a keyhole slot 196 disposed over the opening of the recess. Mating protrusion 176C" is fixedly coupled to irrigant fluid reservoir 174E along an inner side of the reservoir. The recess and/or keyhole slot of coupling connector 182A are configured to receive and/or interlock with mating protrusion 176C" to securely couple irrigation cartridge to the detachable head portion 112. As depicted by the arrows in FIGS. 37-39, mating protrusion 176C" is configured to be inserted into recess 194 and interlock with keyhole slot 196 to secure irrigation cartridge 106E' to head portion 112.

Figure 40:
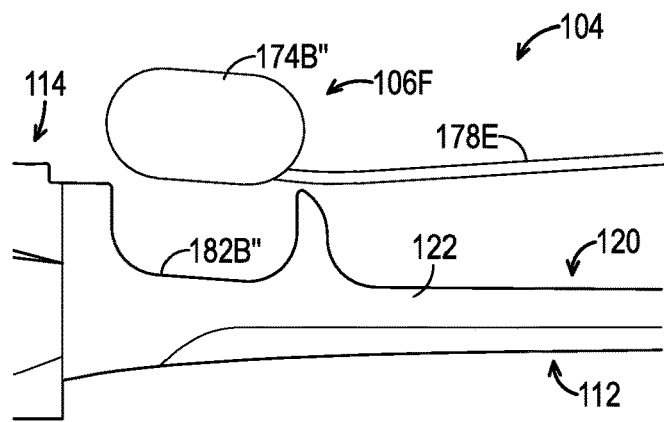
FIG. 40 is a side view of yet another illustrative toothbrush irrigation system having a toothbrush and an eighth configuration of an irrigation cartridge in accordance with aspects of the present disclosure, depicted in a disassembled configuration.

FIG. 40 depicts a toothbrush system similar to the toothbrush system example of FIGS. 18-19, except that irrigation system 104 includes irrigation cartridge 106F. Irrigation cartridge 106F includes an irrigant fluid reservoir 174B", external irrigation tube 178E, and/or fluid connector (e.g., a matting nozzle 188, an irrigation nozzle 189, etc.). External irrigation tube 178E having a distal end configured to externally couple to a distal end of head portion 112 or to an external irrigation exit port. In some examples, the fluid connector is disposed at the distal end of external irrigation tube 178E, such that the distal end of the external irrigation tube may include matting nozzle 188 configured to couple to an external irrigation exit port 110F or irrigation nozzle 189 configured to expel irrigating liquid into the mouth of a patient. In this example, head portion 112 includes a coupling connector configured to securely receive irrigation reservoir 174B". The coupling connector is a cradle 182B" having a curved recess flanked on a proximal and distal end by protrusions configured to securely hold irrigant fluid reservoir 174B" in cradle 182B". Cradle 182B" further includes a hole disposed in the distal protrusion and configured to allow external irrigation tube 178E to pass through the distal protrusion to the distal end of head portion 112.

Figure 41:
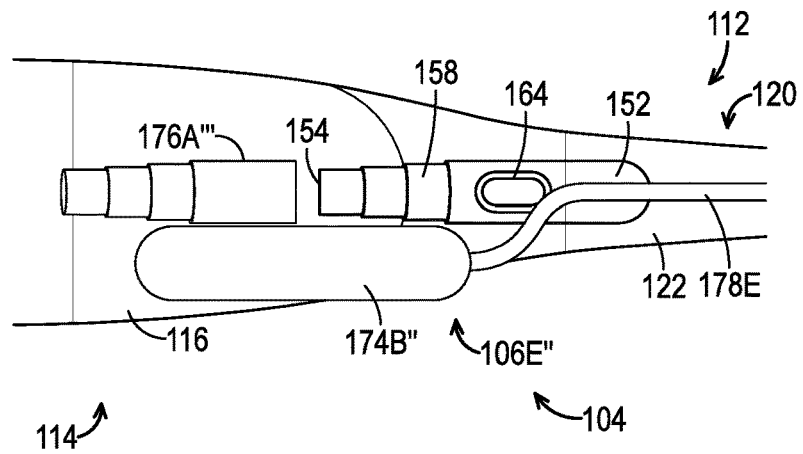
FIG. 41 is a rear view of yet another illustrative toothbrush irrigation system having a toothbrush and a ninth configuration of an irrigation cartridge in accordance with aspects of the present disclosure, depicted in a disassembled configuration.

FIG. 41 depicts a toothbrush system similar to the toothbrush system example of FIGS. 30-31, except that irrigation system 104 includes an irrigation cartridge 106E". Irrigation cartridge E" is another example of irrigation cartridge 106E and includes an irrigant fluid reservoir 174B", external irrigation tube 178E, and a mounting connector 176A'". External irrigation tube 178E is coupled on a proximal end to a distal end of irrigant fluid reservoir 174B" and has a distal end configured to externally couple to a distal end of head portion 112 or to an external irrigation exit port. Mounting connector 176A''' includes a sleeve configured to slip over the proximal end of stem 152 and/or waste collection port 154 to secure irrigation cartridge 106E'' to the stem of head portion 112.

Figure 42:
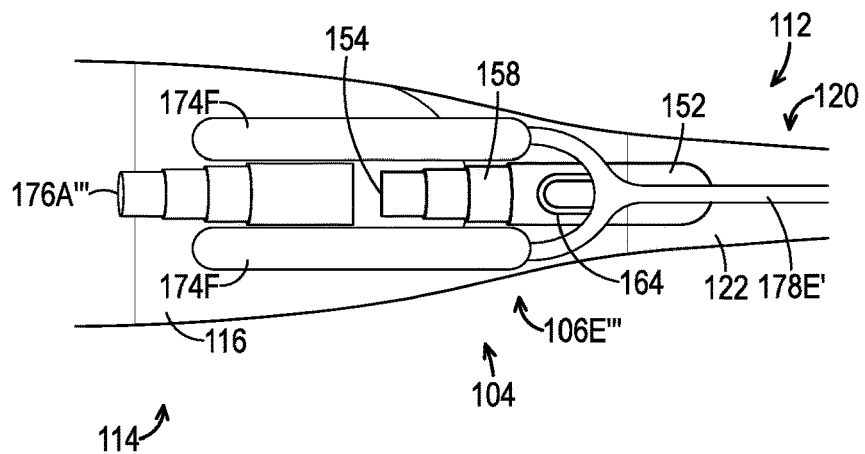
FIG. 42 is a rear view of yet another illustrative toothbrush irrigation system having a toothbrush and a tenth configuration of an irrigation cartridge in accordance with aspects of the present disclosure, depicted in a disassembled configuration.

FIG. 42 depicts a toothbrush system similar to the toothbrush system example of FIG. 41, except that irrigation system 104 includes an irrigation cartridge 106E'''. Irrigation cartridge E''' is another example of irrigation cartridge 106E and includes an irrigant fluid reservoir 174F, external irrigation tube 178E', and a mounting connector 176A''''. Irrigant fluid reservoir 174F is an example of irrigant fluid reservoir 174 and includes two compressible capsules or bulbs configured to hold a predetermined volume of irrigating fluids. The two capsules or bulbs of irrigant fluid reservoir 174F are fluidly coupled on a distal end to external irrigation tube 178E'. External irrigation tube 178E' includes a Y-shaped tube having two proximal ends configured to fluidly couple with the distal ends of the two capsule or bulb. The external irrigation tube 178E' configured to provide a fluid communication between the two capsules or bulbs and a distal end of head portion 112 or to an external irrigation exit port disposed on head portion 112. The two capsules or bulbs of irrigant fluid reservoir 174F are coupled on a respective inner surface to mounting connector 176A''''. Mounting connector 176A'''' includes a sleeve configured to slip over the proximal end of stem 152 and/or waste collection port 154 to secure irrigation cartridge 106E''' to the stem of head portion 112.

Figure 43:
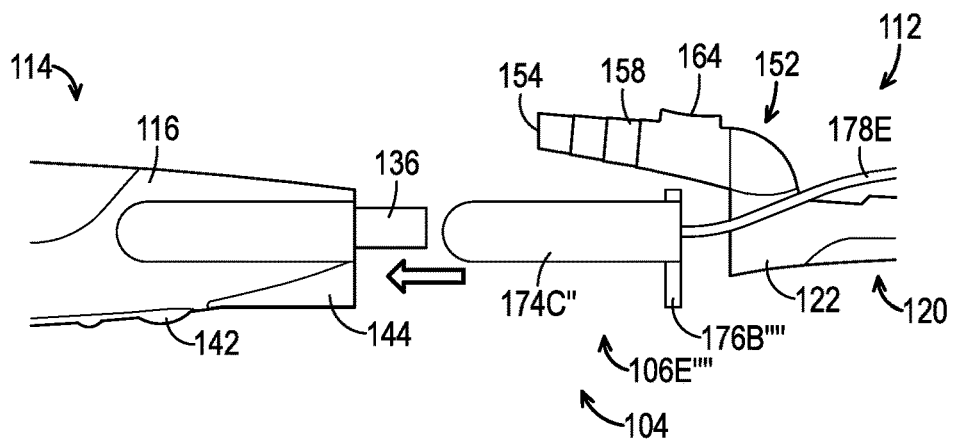
FIG. 43 is a side view of yet another illustrative toothbrush irrigation system having a toothbrush and an eleventh configuration of an irrigation cartridge in accordance with aspects of the present disclosure, depicted in a disassembled configuration.
Figure 44:
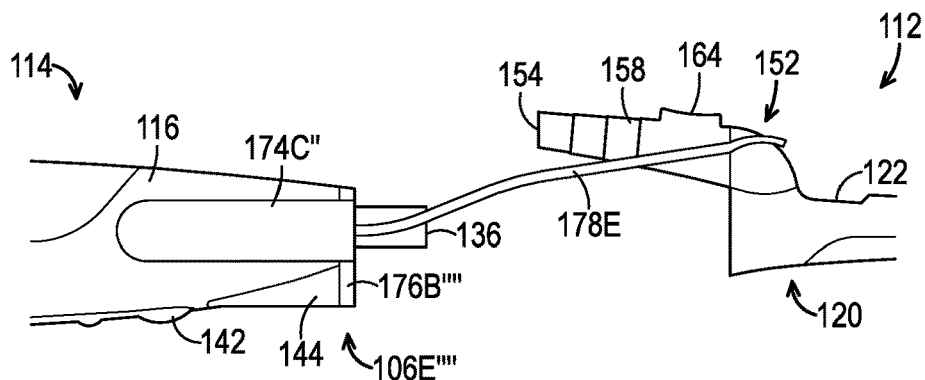
FIG. 44 is a side view of the eleventh irrigation cartridge configuration mounted to a mounting boss of the toothbrush of FIG. 43, in accordance with aspects of the present disclosure.
Figure 45:
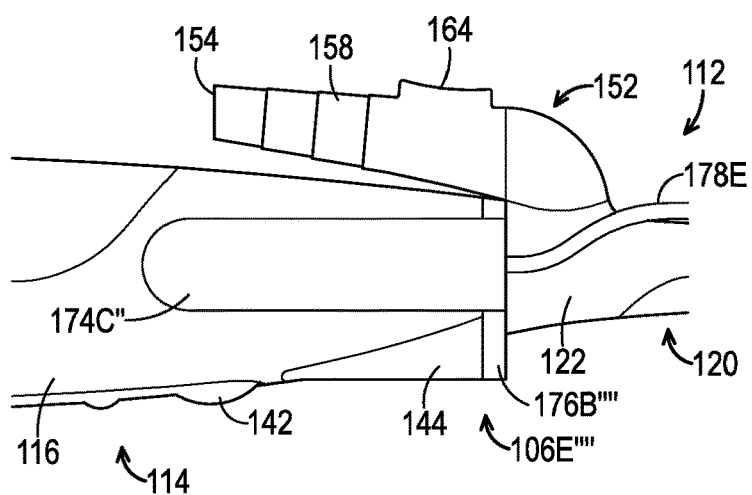
FIG. 45 is a side view of the toothbrush irrigation system of FIG. 43, depicted in an assembled configuration.
Figure 54:
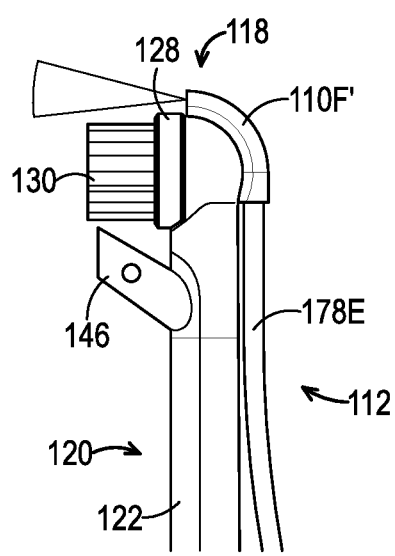
FIG. 54 is a side view of an illustrative head portion of the toothbrush irrigation system having an illustrative first external irrigation exit port, in accordance with aspects of the present disclosure.

FIG. 43-45 depicts a toothbrush system similar to the toothbrush system example of FIGS. 23-26, except that irrigation system 104 includes an irrigation cartridge 106E''''. Irrigation cartridge 106E'''' is another example of irrigation cartridge 106E and includes irrigant fluid reservoir 174C'', external irrigation tube 178E, and mounting connector 176B''''. External irrigation tube 178E is coupled on a proximal end to a distal end of irrigant fluid reservoir 174C'' and has a distal end configured to externally couple to a distal end of head portion 112 or to an external irrigation exit port. Mounting connector 176A''' includes a flange with an aperture sized to fit over mounting boss 136 of handle portion 114 to secure irrigation cartridge 106E'''' to toothbrush 102.

In some examples, head portion 112 includes one or more apertures disposed through a posterior surface of brush head 128 and/or a distal end of exterior casing 122. In the examples of FIGS. 46-49, brush head 128 includes one or more c-shaped apertures 214 (e.g., 2) disposed through the posterior surface of the brush head and external irrigation tube 178E includes a brush head coupling mechanism 216 configured to mate with the c-shaped apertures. Apertures 214 may be any suitable shape and/or size capable of securely coupling brush head coupling mechanism 216 of external irrigation tube 178E to brush head 128. In this example, brush head coupling mechanism 216 includes one or more protrusions formed in a distal end of external irrigation tube 178E and configured to interface with and securely couple to the c-shaped apertures 214 of head portion 112. Brush head coupling mechanism may include any structure(s) capable of interfacing with apertures 214.

In some examples, the distal end of the external irrigation tube 178E includes irrigation nozzle 189. Irrigation nozzle 189 is configured to facilitate the flow of an irrigating fluid from the irrigation cartridge into the mouth of a patient. In some examples, as depicted in FIGS. 46 and 48-49, the distal end of external irrigation tube 178E includes an irrigation nozzle 189A which is an example of irrigation nozzle 189 and includes an injection molded end that may be shaped in a variety of ways to provide certain features to the irrigation pathway (e.g., shape of irrigation dispersal, direction of dispersal, increase of water pressure, etc.). In the examples of FIGS. 46 and 48-49, injection molded end 189A has a flattened shape configured to provide a fan shape fluid dispersal when the irrigating liquid is expelled from the irrigation nozzle.

In some examples, irrigation nozzle 189 may be realized as a distal opening 189B of external irrigation tube 178E (see FIGS. 50-53). In some examples, as depicted in FIGS. 50-53, head portion 112 may include one or more external irrigation tube coupling mechanism(s) 218 disposed in a posterior surface of exterior casing 122 at a distal end of the exterior casing, and/or in a posterior surface of the brush head. External tube coupling mechanism 218 may include any structure capable of securely receiving and holding the external irrigation tube to the head portion of the toothbrush. In some examples, the external tube coupling mechanism 218 includes a pair of resilient protrusions 218A (FIGS. 50-51) disposed on the posterior surface of the exterior casing adjacent the head brush. In some examples, the external tube coupling mechanism 218 includes a groove 218B (FIGS. 52-53) formed in the posterior side of the exterior casing and extending a partial length of the head portion to a base of the brush head. The external tube of the irrigation cartridge may be pushed into resilient protrusions 218A or groove 218B to secure external irrigation tube 178E to head portion 112.

Figure 55:
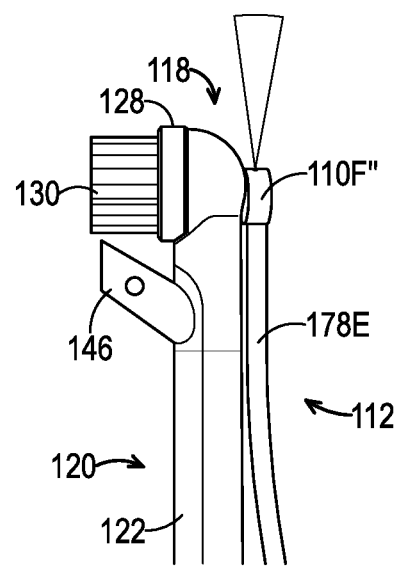
FIG. 55 is a side view of an illustrative head portion of the toothbrush irrigation system having an illustrative second external irrigation exit port, in accordance with aspects of the present disclosure.

In some examples, the distal end of the external irrigation tube 178E includes mating nozzle 188'' configured to receive or be received by a proximal end of an external irrigation exit port 110F. Mating nozzle 188'' may be an insertable matting nozzle, a receptacle matting nozzle, and/or any other nozzle capable of securely coupling the distal end of external irrigation tube 178E to the external irrigation exit port. In some examples, head portion 112 includes an external irrigation exit port 110F' coupled to a distal end of head portion 112 (FIG. 54) or an external irrigation exit port 110F'' coupled to a posterior surface of exterior casing 122 of head portion 112 (FIG. 55). External irrigation exit port 110F may be disposed at any suitable location on head portion 112 capable of facilitating the flow of irrigating liquid into the mouth of a patient. In some examples, external irrigation exit port 110F is configured to expel the irrigating fluid in a distal direction from the head portion. In some examples, external irrigation exit port 110F is configured to expel the irrigating fluid in an anterior direction. In some examples, external irrigation exit port 110F comprises flexible tubing. In some examples, external irrigation exit port 110F comprises rigid tubing. External irrigation exit port 110F may comprise any suitable resilient material configured to be used in medical tubing, such as silicone, polyvinyl chloride, latex, ethyl vinyl acetate, Tygon, and/or the like.

C. Illustrative Method

This section describes steps of an illustrative method for using a toothbrush of the present disclosure. Aspects of electric toothbrush systems described above may be utilized in the method steps described below. Where appropriate, reference may be made to components and systems that may be used in carrying out each step. These references are for illustration, and are not intended to limit the possible ways of carrying out any particular step of the method. Although various steps of the method are described below, the steps need not necessarily all be performed, and in some cases may be performed simultaneously or in a different order.

In a first step, the method includes coupling a first irrigant cartridge to a first head of a motorized toothbrush, such that contents of the cartridge are in fluid communication with an irrigation lumen of the head of the toothbrush. The irrigation lumen is coupled to an exit port of the head. At least part (e.g., a majority) of the irrigation lumen may be internal to the first head. In some examples, the irrigant reservoir comprises a sealed capsule containing a controlled amount of irrigant, and coupling the first irrigant cartridge to the first head comprises unsealing the irrigant reservoir.

In some examples, the first irrigant cartridge is sealed (e.g., the reservoir of the cartridge is sealed), and coupling the first irrigant cartridge to the first head comprises unsealing the cartridge (e.g., unsealing the reservoir). In some examples, the cartridge comprises a mounting connector (e.g., a sleeve or fastener) and a fluid connector (e.g., a tube, lumen, port, nozzle, nipple, and/or hose). Coupling the first irrigant cartridge to the first head may include fastening the cartridge to the first head using the mounting connector, and coupling the cartridge to the irrigation lumen using the fluid connector. The mounting connector may include a sleeve, and fastening the cartridge to the first head may include sliding the sleeve over an external stem protruding from a proximal end of the first head. The stem is in fluid communication with a suction lumen of the first head, and is configured to mate with an external suction source.

In some examples, the irrigant reservoir comprises a compressible capsule containing a controlled volume of irrigant, the first irrigant cartridge is sealed, and the first irrigant cartridge further comprises a mounting connector and a fluid connector. Coupling the first irrigant cartridge to the first head may include unsealing the cartridge, fastening the cartridge to the first head using the mounting connector, and coupling the cartridge to the irrigation lumen using the fluid connector.

In a second step, the method includes holding a handle of the toothbrush while squeezing an irrigant reservoir of the first cartridge to expel an irrigant from the exit port using a same hand. In some examples, the irrigant reservoir comprises a capsule containing a controlled volume of irrigant.

In a third step, the method includes replacing the first cartridge with a second irrigant cartridge. Installation may be substantially identical to the installation of the first cartridge.

In a fourth step, the method includes removing the first head from the handle, such that the second irrigant cartridge remains with the head.

In a fifth step, the method includes replacing the first head with a second head. The second head may be substantially identical to the first head. The method may further include disposing of the first cartridge and/or the first head.

D. Illustrative Combinations and Additional Examples

This section describes additional aspects and features of tooth cleaning systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An electric toothbrush, comprising:
a handle portion including a drive motor;
a head portion coupled to the handle portion, the head portion including an outer shell housing an internal irrigation conduit and a drive shaft, wherein the drive shaft operatively connects the drive motor to a brush disposed at a distal end of the head portion; and
an irrigant reservoir removably coupled to the head portion, wherein the reservoir has a compressible wall accessible external to the outer shell and is in fluid communication with the irrigation conduit;
wherein the head portion is detachable from the handle portion, such that the reservoir is configured to remain with the head portion when the head portion is detached.

A1. The electric toothbrush of A0, wherein the outer shell is hollow, and the head portion further comprises:
a hollow stem extending from a side of the head portion to pass around the handle portion, wherein the stem is configured to mate with an external suction source; and
a suction port protruding from the outer shell, such that a suction path is formed from the suction port to the stem through the hollow outer shell.

A2. The electric toothbrush of A1, wherein the hollow stem extends from the side of a proximal end of the head portion, and includes a suction control aperture configured to be accessed by a user utilizing a same hand to simultaneously access the control aperture and hold the handle portion.

A3. The electric toothbrush of A1 or A2, wherein the reservoir is disposed adjacent the stem when installed.

A4. The electric toothbrush of any one of paragraphs A1 through A3, wherein the reservoir has a sleeve configured to removably mount onto the stem.

A5. The electric toothbrush of any one of paragraphs A0 through A4, wherein the reservoir includes a connector tube fluidly coupled to the irrigation conduit.

A6. The electric toothbrush of any one of paragraphs A0 through A5, wherein the reservoir includes a mounting insert plugged into an opening of the head portion.

A7. The electric toothbrush of A6, wherein the mounting insert is configured to plug into a proximal end of the head portion.

A8. The electric toothbrush of any one of paragraphs A0 through A7, wherein the head portion is fastened to the handle portion by a bayonet mount.

A9. The electric toothbrush of any one of paragraphs A0 through A8, wherein the head portion is disposable.

A10. The electric toothbrush of any one of paragraphs A0 through A9, wherein the reservoir is a single-use hollow bulb.

A11. The electric toothbrush of any one of paragraphs A0 through A10, wherein the reservoir is spherocylindrical (i.e., is shaped as a capsule).

A12. The electric toothbrush of any one of paragraphs A0 through A10, wherein the reservoir comprises a tube having hemispherical ends.

B0. An electric toothbrush, comprising:
a handle including a drive motor;
a head portion removably coupled to the handle, the head portion including a brush, an exit port fed by an internal irrigation lumen, and a drive shaft operatively connecting the drive motor to the brush;

a disposable irrigant reservoir removably coupled directly to the head portion, wherein the irrigant reservoir is in fluid communication with the internal irrigation lumen of the head portion;

wherein the head portion is configured to be replaceable with respect to the handle, and the irrigant reservoir is configured to be replaceable independent of the head portion.

B1. The electric toothbrush of B0, wherein the irrigant reservoir comprises a compressible capsule and is disposed such that the capsule overlaps the handle and the head portion.

B2. The electric toothbrush of B0 or B1, further comprising:

a suction nozzle extending transversely from a distal end of the head portion; and a hollow external stem extending around the handle from a proximal end of the head portion, the hollow stem having an end configured to mate with a suction source;

wherein the head portion is hollow, such that a suction passage is formed from the suction nozzle to the end of the hollow stem through the hollow head portion.

B3. The electric toothbrush of B2, wherein the external stem includes a suction control aperture.

B4. The electric toothbrush of B3, wherein the irrigant reservoir is disposed adjacent the suction control aperture.

B5. The electric toothbrush of any one of paragraphs B0 through B4, wherein the exit port is disposed at a distal end of the head portion, and the irrigation lumen comprises a tube (e.g., a metal tube) extending from the exit port to a proximal end of the head portion.

B6. The electric toothbrush of any one of paragraphs B0 through B4, wherein the irrigant reservoir comprises a squeezable capsule.

C0. A method of using an electric toothbrush, the method comprising:

coupling a first irrigant cartridge to a first head of a motorized toothbrush, such that contents of the cartridge are in fluid communication with an irrigation lumen of the head of the toothbrush, wherein the irrigation lumen is coupled to an exit port of the head;

holding a handle of the toothbrush while squeezing an irrigant reservoir of the first cartridge to expel an irrigant from the exit port using a same hand;

replacing the first cartridge with a second irrigant cartridge;

removing the first head from the handle, such that the second irrigant cartridge remains with the head; and replacing the first head with a second head.

C1. The method of C0, wherein the irrigant reservoir comprises a capsule containing a controlled volume of irrigant.

C2. The method of C0 or C1, wherein the first irrigant cartridge is sealed, and coupling the first irrigant cartridge to the first head comprises unsealing the cartridge.

C3. The method of C2, wherein the cartridge comprises a mounting connector (e.g., a sleeve or fastener) and a fluid connector (e.g., a tube, lumen, port, nozzle, nipple, and/or hose).

C4. The method of C3, wherein coupling the first irrigant cartridge to the first head comprises:

fastening the cartridge to the first head using the mounting connector; and coupling the cartridge to the irrigation lumen using the fluid connector.

C5. The method of C4, wherein the mounting connector comprises a sleeve and fastening the cartridge to the first head comprises sliding the sleeve over an external stem protruding from a proximal end of the first head.

C6. The method of C5, wherein the stem is in fluid communication with a suction lumen of the first head, and is configured to mate with an external suction source.

C7. The method of any one of paragraphs C0 through C6, wherein at least part of the irrigation lumen is internal to the first head.

C8. The method of C7, wherein a majority of the irrigation lumen is internal to the first head.

C9. The method of C0, wherein the irrigant reservoir comprises a sealed capsule containing a controlled amount of irrigant, and coupling the first irrigant cartridge to the first head comprises unsealing the irrigant reservoir.

C10. The method of any one of paragraphs C0 through C9, further comprising disposing of the first cartridge.

C11. The method of any one of paragraphs C0 through C10, further comprising disposing of the first head.

Advantages, Features, and Benefits

The different embodiments and examples of the tooth cleaning systems described herein provide several advantages over known solutions for cleaning patients teeth in a dependent care setting (e.g., extended care facility, in-home healthcare, ICU). For example, illustrative embodiments and examples described herein allow easy disposal of selected components, which allows a single toothbrush handle to be used on multiple patients while still adhering to infection control standards.

Additionally, and among other benefits, illustrative embodiments and examples described herein provide a toothbrush that meets Infection Control standards for preventing device-related infections, by utilizing a single-use, sealed, pre-filled, disposable, controlled-volume compressible capsule or bulb. In some examples, non-reusable (disposable) parts are also incorporated into a disposable brush head. Furthermore, the toothbrush handle and external scavenge tubing can be sanitized separately. Sterility of a multi-use toothbrush is enhanced by the usage of disposable irrigant cartridges or pipettes and brush heads, which allow for the disposal of all components that make direct contact with a patient's mouth, as well as the ability to sanitize all other reusable components.

Additionally, and among other benefits, illustrative embodiments and examples described herein provide a one-handed toothbrush with a highly controllable and simplified irrigation system, such that irrigation can be performed simultaneously using the same hand that holds the brush handle, and in some examples while also controlling suction. Convenience and usability are enhanced by the simplified mechanism of irrigation and the locations of the various components.

Additionally, and among other benefits, illustrative embodiments and examples described herein provide a toothbrush with a highly controllable and simplified irrigation system disposed adjacent a control mechanism of a highly controllable suction system such that both irrigation and suction can be performed using the same hand that holds the brush handle, without repositioning the hand.

Additionally, and among other benefits, illustrative embodiments and examples described herein provide a cost-effective and efficient irrigation system that utilizes a custom pre-filled, sealed, disposable irrigation cartridge.

Additionally, and among other benefits, illustrative embodiments and examples described herein provide irrigation conduits or lumens configured to have minimal impact on the external dimensions of the brush head and/or head portion, so as to maximize the possible clearance of the brush head and/or head portion with respect to a patient's mouth while performing oral health care.

Additionally, and among other benefits, illustrative embodiments and examples described herein provide a toothbrush head portion with a streamlined design configured to lessen the chance of the head portion snagging on a patient's teeth or on other objects that may be present in a patient's mouth during the performance of oral health care.

Additionally, and among other benefits, illustrative embodiments and examples described herein provide a toothbrush system wherein a head drive shaft, a suction system, and an irrigation system, are all disposed in and/or on a disposable head portion to facilitate the disposal of all possibly contaminated systems.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A method of operating an electric toothbrush, the method comprising:
   coupling a first head portion to a handle portion of the electric toothbrush, such that a drive shaft of the first head portion is operatively connected to a drive motor of the handle portion;
   removably coupling an irrigant reservoir directly to the first head portion using a mounting connector of the irrigant reservoir;
   placing a fluid connector of the irrigant reservoir into fluid communication with an internal irrigation conduit of the first head portion, wherein the mounting connector and the fluid connector extend from a body of the reservoir;
   compressing an externally accessible wall of the body of the irrigant reservoir; and
   detaching the first head portion from the handle portion of the electric toothbrush while the reservoir remains with the first head portion.

\* \* \* \* \*